Figure 1:
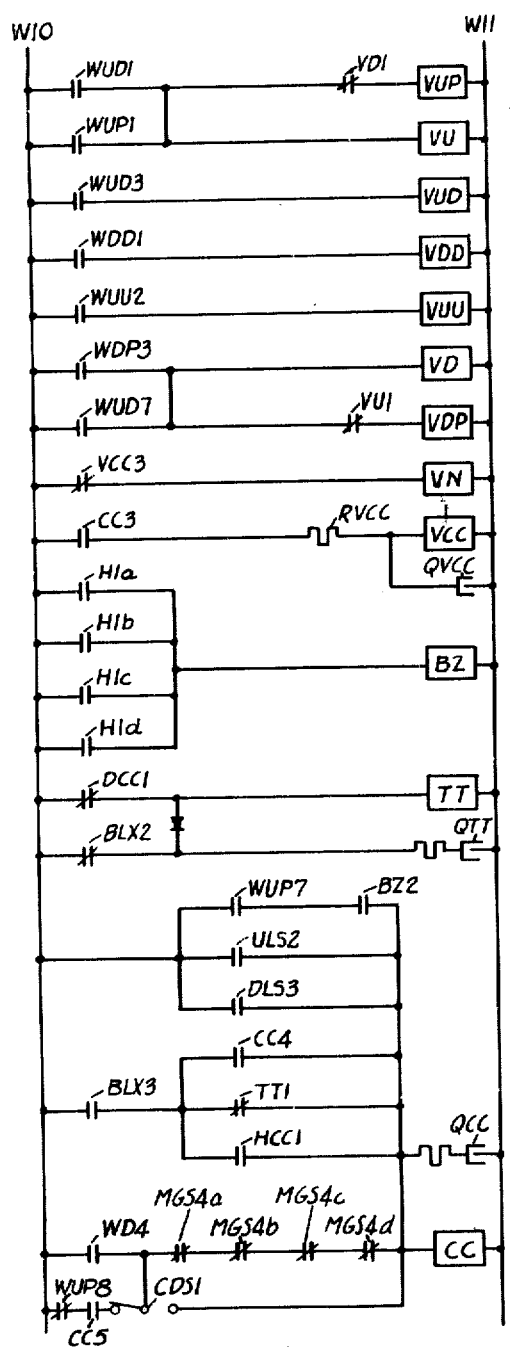

Sept. 4, 1956     W. F. GLASER ET AL     2,761,528
ELEVATOR DISPATCHING AND CONTROL SYSTEM
Filed Aug. 10, 1953     9 Sheets-Sheet 1

WILLIAM FRANK GLASER
STEPHEN ANTHONY HORNUNG } INVENTORS

BY  J. L. Aaron  ATTORNEY

Sept. 4, 1956 W. F. GLASER ET AL 2,761,528
ELEVATOR DISPATCHING AND CONTROL SYSTEM
Filed Aug. 10, 1953 9 Sheets-Sheet 5

WILLIAM FRANK GLASER
STEPHEN ANTHONY HORNUNG } INVENTORS

BY J. L. Sharon ATTORNEY

FIG. 8b

Sept. 4, 1956     W. F. GLASER ET AL     2,761,528
ELEVATOR DISPATCHING AND CONTROL SYSTEM
Filed Aug. 10, 1953     9 Sheets-Sheet 9

FIG. 8e

WILLIAM FRANK GLASER
STEPHEN ANTHONY HORNUNG    INVENTORS

BY    ATTORNEY

United States Patent Office 2,761,528
Patented Sept. 4, 1956

2,761,528

ELEVATOR DISPATCHING AND CONTROL SYSTEM

William Frank Glaser, Tuckahoe, and Stephen Anthony Hornung, New York, N. Y., assignors to Otis Elevator Company, New York, N. Y., a corporation of New Jersey Application August 10, 1953, Serial No. 373,232

49 Claims. (Cl. 187—29)

The invention relates to dispatching and control systems for elevators.

While dispatching and control systems may be applied to elevators in various types of buildings, they are especially suitable for and widely used in office buildings. Usually in a large office building for example there is during the morning prior to the start of a working day an intermittent traffic period when there is little call for elevator service. After this comes a heavy up traffic period when the office personnel arrive to be taken to the various floors. Then there is the period in the evening of heavy down traffic when the building is being depopulated. Between the morning and evening peaks is the interim period when traffic is considerable and may be substantially equal in both directions or such that down traffic predominates as during the noon outgoing lunch period or up traffic predominates as during the end of the lunch period. Then after the evening peak, intermittent traffic prevails again.

There is considerable advantage in providing operating programs for the particular building best to meet the different traffic conditions which arise throughout the day and various arrangements have been devised to provide such programs. Largely in the past, in elevator installations having such operating programs, the cars have been provided with attendants. The selection of the operating programs has been the function of the elevator starter or supervisor through manual controls provided on the dispatching panel, usually in the lobby of the building, and this has been carried over into intensive service elevator installations operating without attendants which are now coming into extensive use. To realize the full potentialities of such systems and to eliminate the human element, it is desirable to select the programs automatically to accommodate the different traffic conditions.

It is the principal object of the invention to provide a dispatching and control system for a group of elevators in which the operating programs are selected automatically in accordance with the traffic conditions which are to be met.

In carrying out the invention, in the morning before the up peak starts, the system is operated on an intermittent program. As soon as traffic conditions indicate that the morning peak is starting, the system automatically switches over to the up peak program. It stays on this program until the up peak subsides. If at this time there is a substantial amount of down traffic to be handled, the system automatically throws over to an interim program. In the evening, as soon as traffic conditions indicate that the evening peak is starting, the system automatically switches over to the down peak program. After the down peak subsides, the system automatically returns to the intermittent program.

According to the preferred arrangement, all the cars do not operate under the intermittent program; the amount of load (passengers) taken in an intermittent program car at the main landing is utilized as an indication of the arrival of the morning peak; the down service demand at the end of the morning peak is utilized as a measure of down traffic to be handled; preponderance of down traffic over up traffic is utilized as an indication of the arrival of the evening peak; and the extent of falling off of service demand is utilized to determine when to return to the intermittent program. The system may switch back to the intermittent program at any time when there is insufficient demand for service. Also the system may automatically switch from the interim program to the up peak program when there is sufficient predominance of up traffic over down traffic. In addition the system may automatically shift from the intermittent program to the up peak program in response to service demand conditions from the landings, thus providing more cars to meet this increased demand.

Also, in accordance with the preferred arrangement, the ratio of the amount of up traffic to down traffic is determined in accordance with whether the cars are early or late in arriving at the bottom terminal. If the cars are early, it indicates that the ratio of up traffic to down traffic has increased. If they are late, it indicates that the ratio of down traffic has increased. As soon as lateness or earliness of the cars indicates a trend, the system is automatically thrown over to a program to take care of the change.

There are advantages during the interim period in providing operation to take care of heavier up traffic than down traffic but less than up peak conditions and in providing operation to take care of heavier down traffic than up traffic but less than down peak conditions, and such arrangement will be described. With such arrangement, when operating under the balanced interim (substantially equal up-down traffic) program and there is a preponderance of late cars, the system automatically throws over to the heavier down program, and when operating on this program and there is a proponderance of late cars, the system automatically throws over to the down peak program. Under like conditions, the system automatically throws over from the heavier up program to the balanced interim program. When operating under the balanced interim program and there is a preponderance of early cars, the system automatically throws over to the heavier up program, and when operating under this program and there is a preponderance of early cars, the system automatically throws over to the up peak program. Under like conditions, the system automatically throws over from the heavier down program to the balanced interim program. From either peak program the system is thrown to the balanced interim program after the peak subsides but may be thrown to the intermittent program if service demand ceases.

The system preferably is also arranged to anticipate the regular peak programs, as by a clock. Also, the system automatically distinguishes between a working day and a non-working day. When on a working day the system is not thrown back to the intermittent program until the down evening peak has subsided.

The dispatching interval is continuously adjusted to meet traffic conditions. If when operating on an interval which is a minimum for providing satisfactory service, there are still too many cars for the traffic conditions, a car is automatically removed from service. If this does not correct the condition still another car is automatically removed from service. If, when one or more cars are out of service, conditions become such that more cars in service are indicated, a car is automatically returned to service.

Features and advantages of the invention will be gained from the above description and from the appended claims.

Figure 2:
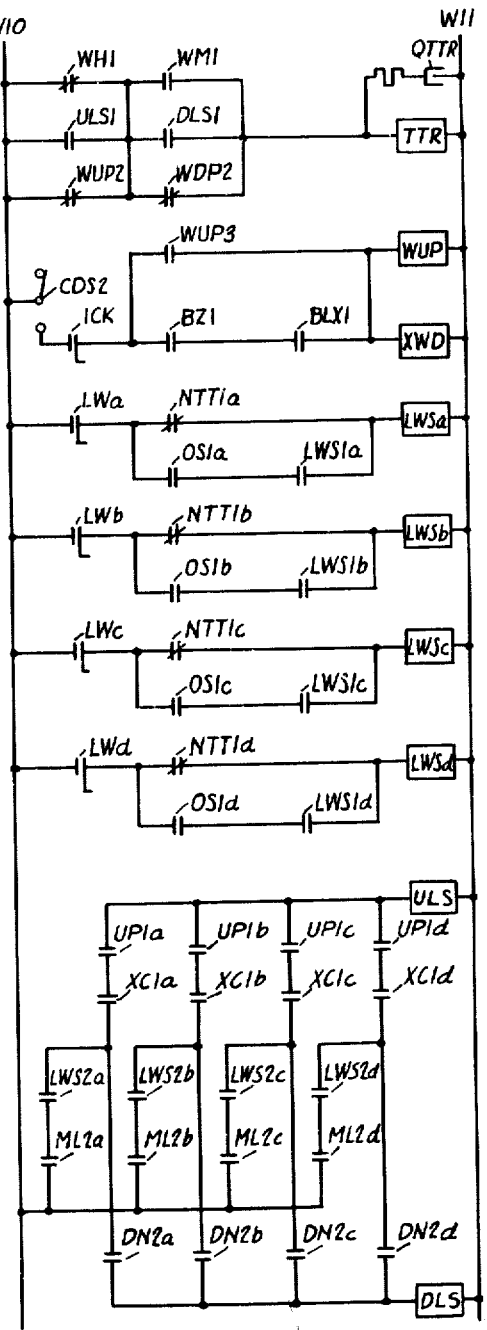
Figure 3:
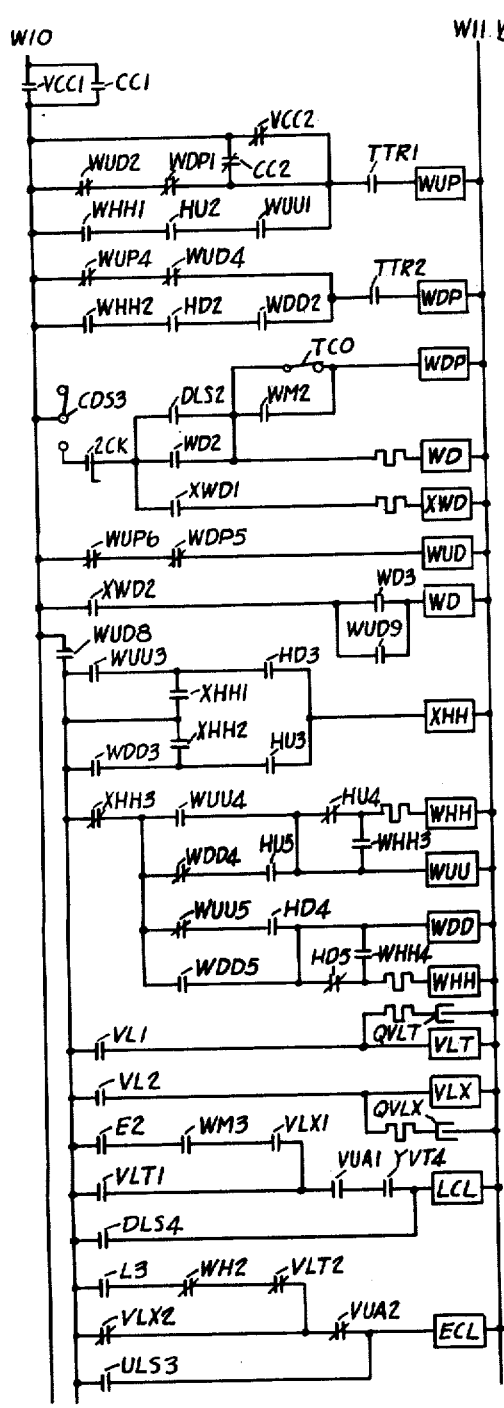
Figure 4:
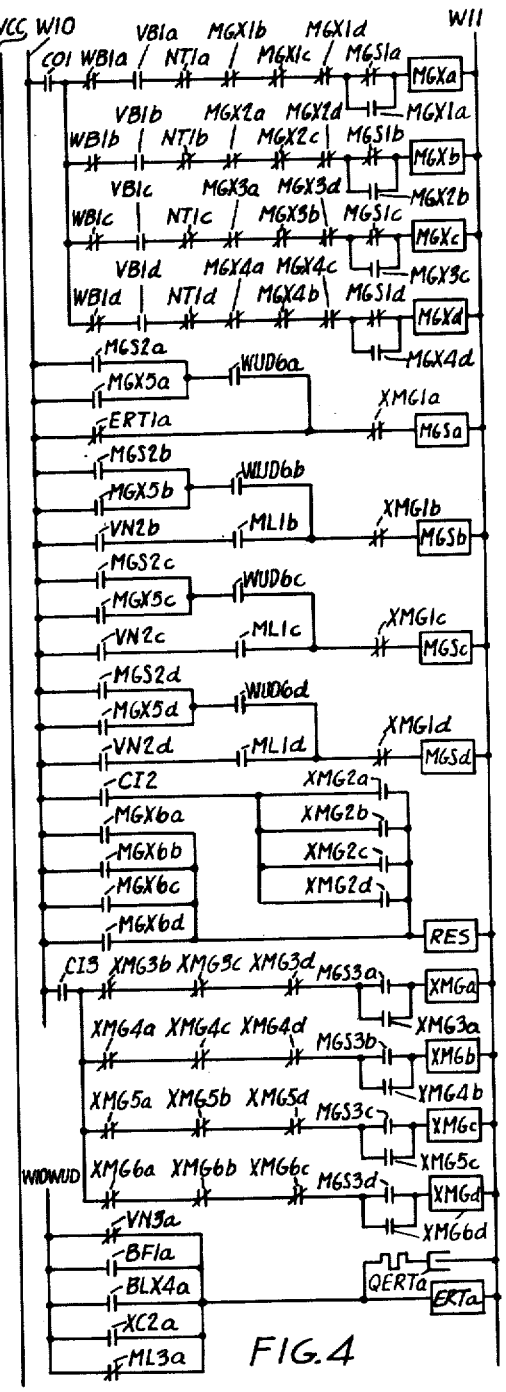
Figure 5:
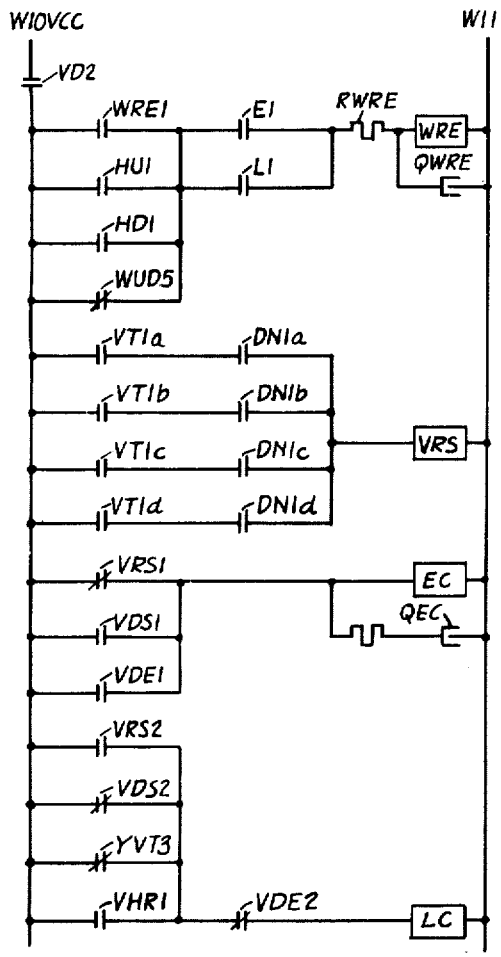
Figures 6, 7:
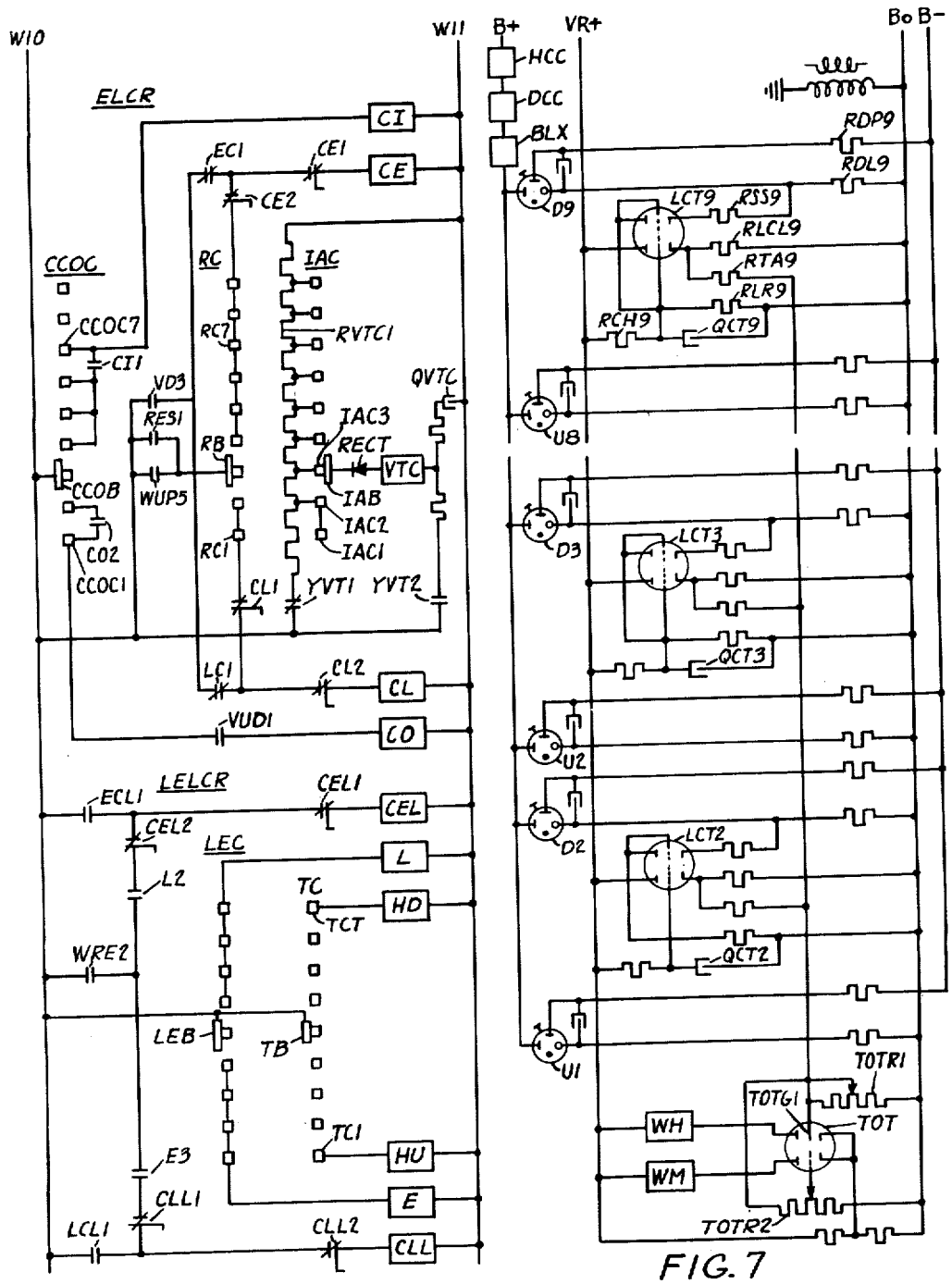
Figure 8A:
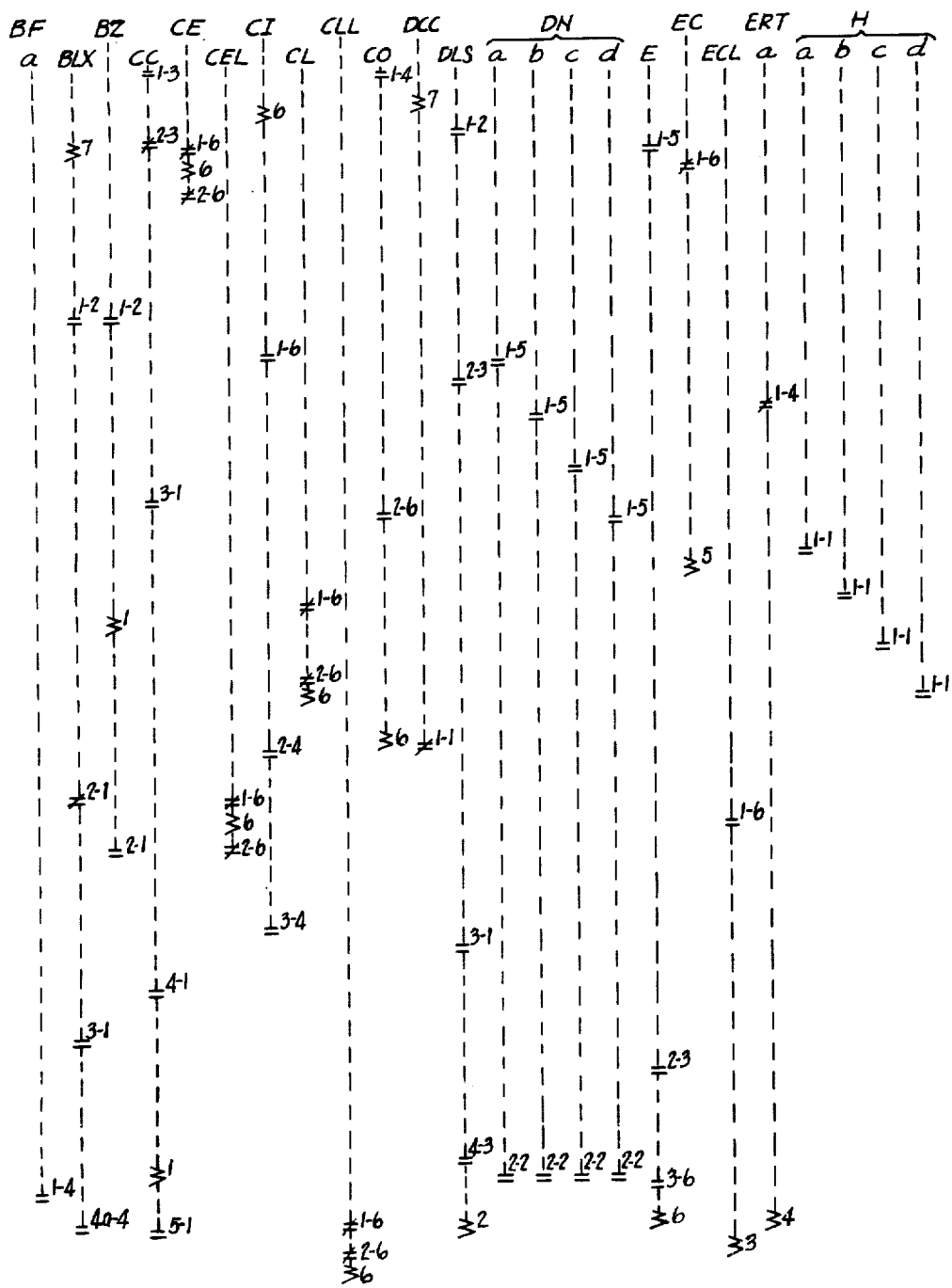
Figure 8C:
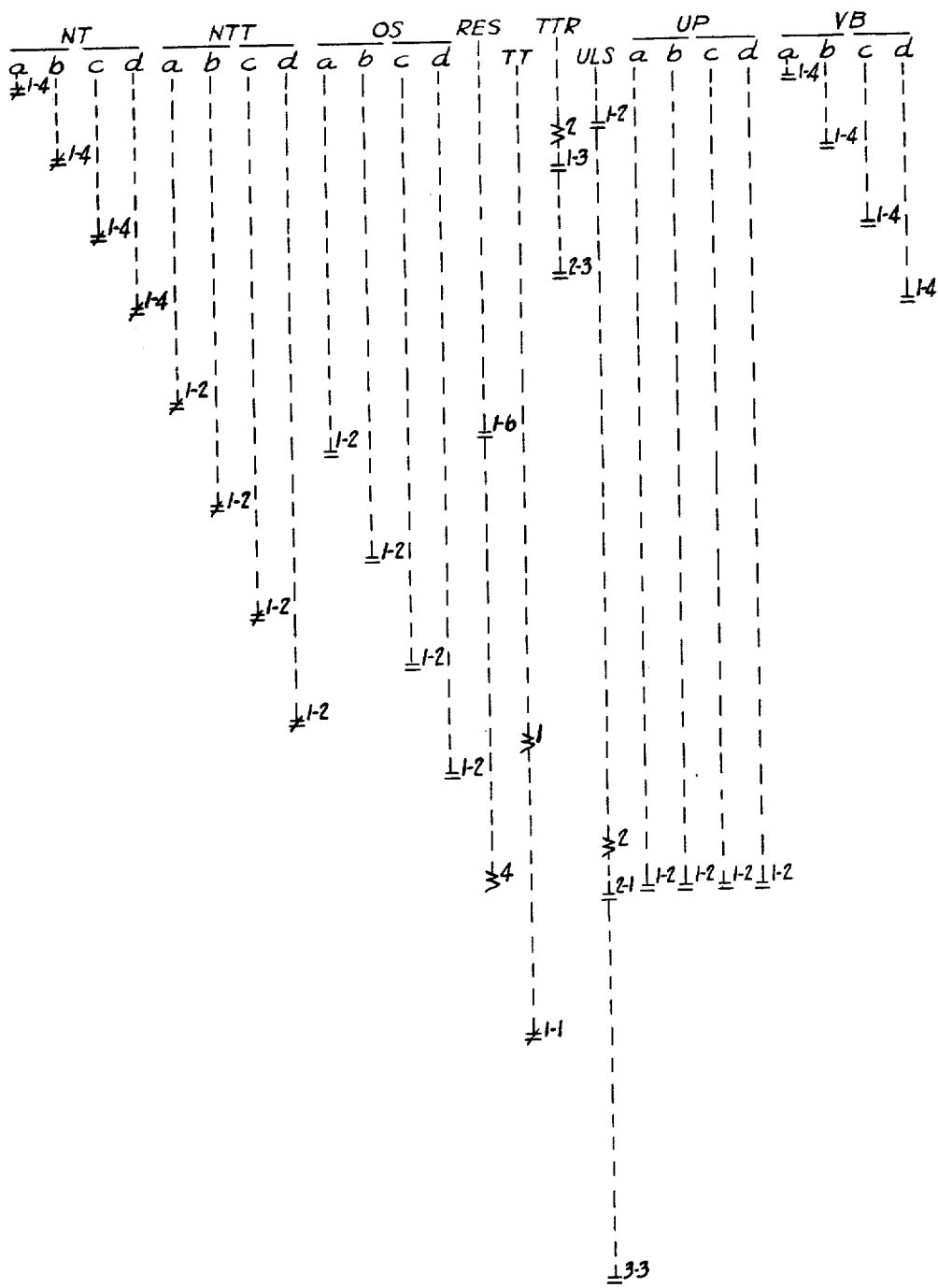
Figure 8D:
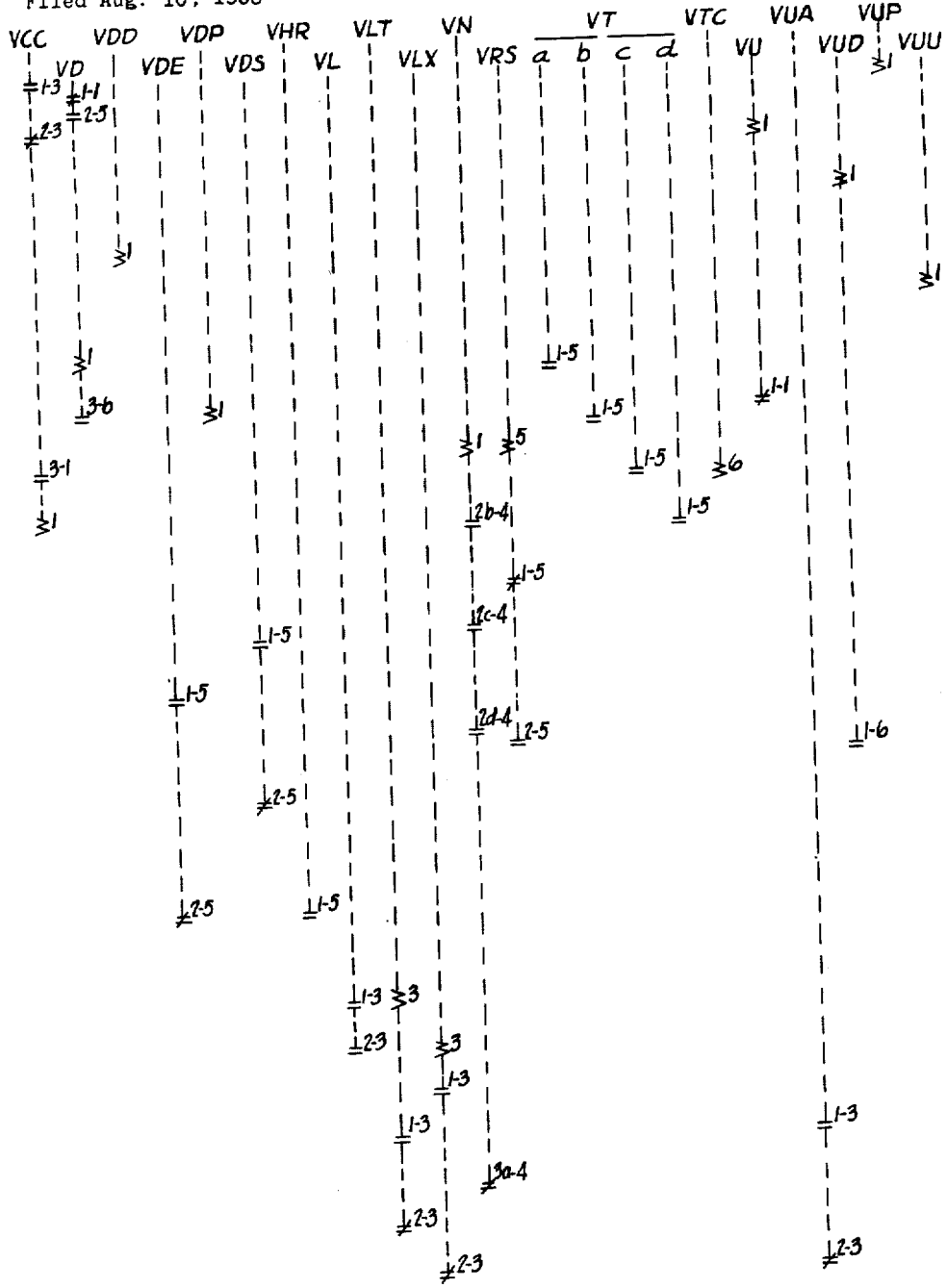

In the drawings:

Figures 1 to 7 taken together constitute a simplified schematic wiring diagram of automatic program selection circuits of a dispatching and control system for a four car elevator installation; and Figures 8a to 8e are key sheets for Figures 1 to 7, showing the electromagnetic switches in spindle form.

The invention will be illustrated, by way of example, as applied to the dispatching and control system of the Glaser and Hornung Patent No. 2,589,242. The operating programs provided by the system of this patent are for heavy up traffic which is termed up peak, for traffic in both directions but with more in the up direction which is termed heavier up, for substantially equal traffic in both directions which is termed balanced, for traffic in both directions but with more in the down direction which is termed heavier down, for heavy down traffic which is termed down peak and for intermittent traffic which is termed night, which may also be termed off peak or intermittent. The invention as applied to the system of the Glaser and Hornung patent contemplates automatically switching from one of these programs to another as traffic conditions dictate. While the preferred arrangement contemplates a dispatching system with the operating programs of this Glaser and Hornung patent it is to be understood that the invention may be applied to other forms of dispatching systems in which different operating programs having similar or different features are provided to meet different traffic conditions.

To facilitate and simplify the disclosure, only the circuits for automatically switching over from one program to another are shown. These are illustrated as arranged to control the electromagnetic switches of the aforesaid Glaser and Hornung patent which set that system for these different traffic programs. In view of the various simplifications in the circuits of the Glaser and Hornung patent and of those which have been illustrated, it is to be understood that many changes may be made in adapting this invention to commercial installations and to comprehensive control and dispatching circuits not shown herein.

The electromagnetic switches employed in the system illustrated are designated as follows:

BF—Basement service relay
BLX—Landing call switch
BZ—Group car running switch
CC—Continuous call relay
CE—Early car rotary coil
CEL—Lobby early car rotary coil
CI—Car in switch
CL—Late car rotary coil
CLL—Lobby late car rotary coil
CO—Car out switch
DCC—Double landing call switch
DLS—Down load switch
DN—Down direction switch
E—Early car position switch
EC—Early car switch
ECL—Early car lobby switch
ERT—Excitation time relay
H—Field and brake switch
HCC—Multiple landing call switch
HD—Heavier down operating switch
HU—Heavier up operating switch
L—Late car position switch
LC—Late car switch
LCL—Late car lobby switch
LWS—Load weighing switch
MGS—Motor generator cut-out switch
MGX—Auxiliary motor generator cut-out switch
ML—Main landing switch
NT—Hall time switch
NTT—Auxiliary hall time switch
OS—Operating switch sequence relay
RES—Rotary reset switch
TT—Timed transfer switch
TTR—Interim timed transfer switch ULS—Up load switch
UP—Up direction switch
VB—Bottom terminal relay
VCC—Auxiliary continuous call relay
VD—Down traffic switch
VDD—Down interim traffic switch
VDE—Detent switch
VDP—Down peak switch
VDS—Down signal switch
VHR—Reset cut-out switch
VL—Instantaneous reset switch
VLT—First lobby time switch
VLX—Second lobby time switch
VN—Night service switch
VRS—Car terminal switch
VT—Top terminal relay
VTC—Interval timing switch
VU—Up traffic switch
VUA—Auxiliary up signal switch
VUD—Interim traffic switch
VUP—Up peak switch
VUU—Up interim traffic switch
WB—Bottom selection switch
WD—Day program switch
WDD—Automatic down interim switch
WDP—Auxiliary down peak switch
WH—Heavy down call switch
WHH—Heavy interim transfer switch
WM—Medium down call switch
WRE—Lobby car reset switch
WUD—Automatic interim traffic switch
WUP—Automatic up peak switch
WUU—Automatic up interim switch
XC—Highest car call relay
XHH—Balanced interim transfer switch
XMG—In service motor generator switch
XWD—Day program selection switch
YVT—Delay timing switch Throughout the description which follows, these letters will be applied to the respective switch coils and, with reference numerals appended thereto, they will be applied to the respective switch contacts. Differentiation will be made between the different elevators by appending to the characters employed to designate the various elements of the system small case letters $a$, $b$, $c$ and $d$ indicative of the different elevators. Switches LW are load weighing contacts and may be mechanically operated as beneath the car platforms.

The circuits are shown in "across-the-line" form in which the coils and contacts of the various switches are separated in such manner as to render the circuits as simple and direct as possible. The relationship of the coils and contacts may be seen from Figures 8a to 8e wherein the switches are arranged in alphabetical order with the coils and contacts of the various switches positioned on spindles. The coils and contacts are related to the wiring diagrams by applying to the particular coil or contact the number of the figure in which it occurs, this being appended following a dash to the particular designation for the contacts. Each coil and contact is positioned on the spindle sheet in alignment with its position on the particular wiring diagram. Thus to locate contacts CC1 for example, referring to spindle sheet 8a it will be found that contacts number 1 of switch CC have applied thereto following a dash the numeral 3. This means that these contacts appear in Figure 3. The contacts may then be located by aligning the sheet on which Figure 3 appears with the sheet on which Figure 8a appears and will be found in Figure 3 in alignment with the contacts in Figure 8a.

The electromagnetic switches are illustrated in deenergized condition and switch XWD which is of the latching type is shown in reset condition. This switch has two coils, one an operating or set coil (upper) and the other a reset coil (lower). Each of switches WUP, WDP, WD and WHH has two operating coils.

Of the above electromagnetic switches, VD, VDD, VDP, VN, VTC, VU, VUD, VUP and VUU are switches of the aforementioned Glaser and Hornung patent with the circuits for their coils arranged in accordance with the invention. Electromagnetic switches BF, DN, H, ML, NT, NTT, UP, VB, VDE, VDS, VHR, VL, VT, VUA, WB, XC and YVT are also switches of the aforementioned Glaser and Hornung patent, only contacts of these switches being illustrated, it being understood that the circuits for their coils are as illustrated in the Glaser and Hornung patent.

It is to be noted from the above list of switches that CE, CL, CEL, CLL are specified as coils. Coils CE and CL are the operating coils of a bi-directional rotary stepping switch designated as a whole as ELCR while CEL and CLL are the operating coils of a bi-directional rotary stepping switch designated as a whole as LELCR, see Figure 6. Switch ELCR has three sections of contacts designated CCOC—Car cut-out contacts
RC—Reset contacts
IAC—Interval adjustment contacts, the brushes for engaging these contacts being designated CCOB, RB and IAB respectively. Switch LELCR has two sections of contacts designated LEC—Late-early contacts
TC—Traffic contacts, the brushes for which being designated LEB and TB respectively. These brushes of each switch are rotated in step by step movement by these operating coils, upward movement being effected by coils CE and CEL and downward movement by coils CL and CLL. Successive deenergizations of coils CE, CL, CEL and CLL are effected by contacts CE1, CL2, CEL2 and CLL1 respectively. CE2, CL1, CEL1 and CLL2 are overtravel limit switches. Each of these rotary switches has a neutral position to which the brushes are reset as will be explained later.

The medium and heavy down call switches WM and WH are controlled by the total accumulated time that registered down calls remain unanswered. The circuits controlling these switches are taken from the aforementioned Glaser and Hornung patent, appearing in Figure 10. The elements of the circuits utilized have been given the same general designations as in the patent although circuits for different floors have been illustrated to indicate that all down calls above the lobby are effective. Tube TOT is a tube similar to tube LCCT of the patent. The circuits for the touch button tubes D and U for both down calls and up calls are included (basement and lobby down call tubes not being illustrated) to illustrate the operation of switches HCC, DCC and BLX, the coils of which are connected in a feed line common to the tubes. A break is made in the feed lines between tubes U8 and D3 to indicate that the circuits for the intervening tubes and call cumulative circuits are not shown. Call pick-up and highest call circuits are not shown as they appear in the Glaser and Hornung patent. Also relay XVO is not included as its circuits appear in the patent.

While circuits for controlling the motor generator sets for the various elevators are shown, the motor generator sets are not included. It will be understood that the motor generator set for any elevator is shut down when its motor generator cut-out switch MGS is operated. The feed lines are designated to correspond with those of the Glaser and Hornung patent.

In describing the operation of the system it will be assumed for convenience that the system is operating under the intermittent program, that the heavy influx of traffic is near, and that car $a$ provides service under the intermittent program and has just returned to the lobby floor. Under such conditions, switches VN, ML$a$, UP$a$, TT and TTR are in operated condition as will be seen from later description. Under this assumption, the motor generator set for car $a$ is in operation and the motor generator sets for the other cars are shut down. The motor generator set for car $a$ is maintained in operation through the control of excitation time relay ERT$a$. When the system is on the intermittent program, contacts VN3$a$ are separated, so that the registration of any call to which car $a$ is subject completes a circuit for the coil of relay ERT$a$ through one or more of contacts BF1$a$, BLX4$a$ or XC2$a$, landing call switch BLX operating whenever a landing call is registered. When the car is away from the main landing, contacts ML3$a$ maintain the coil of relay ERT$a$ energized. When the car arrives at the main landing with all calls responded to, the circuit for the coil of relay ERT$a$ is broken, the relay being delayed in dropping out however by the discharge of condenser QERT$a$. Thus contacts ERT1$a$ are maintained separated and, as contacts WUD6$a$ are separated, the coil of motor generator cut-out switch MGS$a$ is maintained deenergized, thus maintaining the motor generator set for car $a$ in operated condition. The shutting down of the motor generator sets for cars $b$, $c$ and $d$ is effected by causing switches MGS for these cars to be operated. The circuits are completed by contacts VN2$b$, VN2$c$, VN2$d$ and extend through the coils of these switches by way of contacts XMG1$b$, XMG1$c$ and XMG1$d$, and contacts ML1$b$, ML1$c$ and ML1$d$ respectively.

Assume further that, when car $a$ arrives at the lobby floor, there are several passengers waiting there and enter the car. Assume that these passengers register their car calls so that relay XC$a$ is operated. If these passengers are of sufficient number, load weighing contacts LW$a$ close. These contacts are preferably set to operate at less than full load, say 50%. Their closing together with the closing of contacts NTT1$a$ incident to starting the car completes a circuit for the coil of load weighing switch LWS$a$. This switch operates to engage contacts LWS1$a$ to complete a holding circuit through contacts OS1$a$. It also engages contacts LWS2$a$ to complete a circuit through contacts ML2$a$, XC1$a$ and UP1$a$ for the coil of up load switch ULS. This switch operates to engage contacts ULS2, completing a circuit for the coil of continuous call relay CC. This relay operates to engage contacts CC3, completing a circuit for the coil of auxiliary continuous call relay VCC. It also engages contacts CC1 and separates contacts CC2. Inasmuch as relay VCC is delayed in operating by resistor RVCC and condenser QVCC, contacts VCC2 do not separate immediately so that the engagement of contacts CC1 completes a circuit through contacts TTR1 for the upper coil of automatic up peak switch WUP. This switch operates to engage contacts WUP7, completing a holding circuit for the coil of relay CC through contacts BZ2, engaged as a result of the engagement of contacts H1$a$ in starting the car. In addition switch WUP separates contacts WUP4 to prevent operation of switch WDP. Switch WUP also separates contacts WUP6, breaking the circuit for the coil of automatic interim traffic switch WUD, completed momentarily by the engagement of contacts CC1. Thus, if switch WUD does operate to separate contacts WUD2, contacts VCC2 enable the circuit for the coil of switch WUP to be established, while contacts WUD2 engaged as a result of the separation of contacts WUP6 maintain the circuit for the coil of switch WUP after contacts VCC2 separate. Switch WUP also engages contacts WUP1 to complete a circuit for the coils of up traffic switch VU and up peak switch VUP. This throws the system to the up peak program, as explained in the aforesaid Glaser and Hornung patent.

In effecting the change from the intermittent to the up peak program, contacts VCC3 separate to break the circuit for the coil of switch VN. Thus contacts VN2$b$, VN2c and VN2d separate, breaking the circuits for the coils of switches MGSb, MGSc and MGSd respectively. Thus switches MGSb, MGSc and MGSd drop out to cause the starting up of the motor generator sets for cars b, c and d.

The system continues to operate on the up peak program until there is insufficient service demand or there is sufficient down traffic to warrant a change. If service demand subsides, the separation of contacts BLX3 disconnects the coil of switch CC from the supply lines provided also that contacts BZ2 are separated indicative of no car running and that contacts ULS2 are separated indicative of no loaded car at the lower terminal. If this condition persists for the time interval provided by the discharge of condensers QCC and QVCC, relay CC and then relay VCC drop out, causing the dropping out of switch WUP and the operation of switch VN, throwing the system back to the intermittent program. The separation of contacts CC5 prevents reestablishment of the circuit for the coil of switch CC upon the reengagement of contacts WUP8. As to down traffic, according to the preferred arrangement, when one or more overlapping down calls exist for a certain interval of time, the system is thrown over to the interim balanced program, that is for serving substantially equal up and down traffic. This is effected through the control exercised on heavy down call switch WH by the cumulative call time measuring circuits of Figure 9. As explained in the aforementioned Glaser and Hornung patent, the charging circuits for condensers QCT are shunted out when calls are not registered. When a down call is registered, say by tube D9, condenser QCT9 starts to charge, with the result that the potential of grid TOTG1 of tube TOT gradually rises to increase the current flow through tube TOT. If a down landing call for another floor is registered, this further increases the current flow through the tube. Upon this current reaching a certain value, dependent upon the total call second accumulated time that down calls remain unanswered, switch WH operates. This total time accumulation may be sixty seconds, depending upon the requirements of the particular installation, and is adjustable by means of resistor TOTR1.

Upon operation, switch WH separates contacts WH1, breaking the circuit for the coil of interim timed transfer switch TTR. This switch does not drop out immediately, being delayed by the discharge of condenser QTTR for a period of say thirty seconds. Thus if unanswered down calls persist for this additional period to maintain contacts WH1 separated and up peak conditions do not exist as indicated by the failure of contacts ULS1 to close within this period, switch TTR drops out to separate contacts TTR1, breaking the circuit for the upper coil of switch WUP. This switch drops out to separate contacts WUP7, the circuit for the coil of relay CC being maintained under the assumed conditions through contacts BLX3 and CC4. It also engages contacts WUP6, completing the circuit for the coil of switch WUD. Switch WUD operates to separate contacts WUD4 to prevent operation of switch WDP. It also separates contacts WUD2 to keep switch WUP deenergized after the reenergization of switch TTR as a result of the engagement of contacts WUP2. It also engages contacts WUD1, WUD3 and WUD7 to complete the circuits for the coils of up traffic switch VU, interim traffic switch VUD and down traffic switch VD respectively. This throws the system to the interim balanced program, as explained in the aforesaid Glaser and Hornung patent. The separation of contacts VU1 and VD1 prevents the operation of peak switches VDP and VUP at this time.

The engagement of contacts VD2 and VD3 as a result of the operation of switch VD renders the early-late car circuits effective to control the dispatching of the cars. This includes the rotary switches ELCR and LELCR. In accordance with the arrangement of the aforementioned Glaser and Hornung patent, when on the balanced interim program the cars are dispatched on a time basis from both terminals. When the dispatching interval is correctly set, the cars will just be ready for dispatching when the dispatching interval expires. The dispatching interval is determined by the timing of switch VTC. This in turn is determined by the amount of resistor RVTC1 connected in the discharge circuit of condenser QVTC. The amount of resistor so connected is dependent on the position of brush IAB of rotary switch ELCR. This brush is set to be in engagement with contact IAC3 for average balanced traffic conditions. When relay YVT operates to engage contacts YVT2, a circuit is completed for charging condenser QVTC and also a circuit is completed for the coil of switch VTC through the section of resistor RVTC above brush IAB. Thus when relay YVT drops out to separate contacts YVT2, switch VTC remains operated until the charge on condenser QVTC decreases to a point drop out voltage of switch VTC above the potential drop across the upper section of the resistor. Thus the lower the resistance drop across the section of the resistor, the longer the hold in time of switch VTC and thus the longer the dispatching interval, and vice versa. The amount of effective upper section of the resistance and thus the resistance drop is reduced by upward movement of brush IAB and increased by downward movement of the brush. This movement of the brush is effected in accordance with whether the cars are late or early in arriving at the upper terminal. A car is late when it has not arrived at the upper terminal by the time that the dispatching operation is initiated and is early when it arrives at the upper terminal more than a certain interval, say six seconds, before the dispatching operation is initiated.

When a car, say car a arrives at the upper terminal and becomes set for downward travel, contacts VT1a and DN1a engage to complete a circuit for the coil of car terminal switch VRS. This switch operates to disconnect the coil of early car switch EC from the feed lines, this switch having previously been operated as a result of the engagement of contacts VD2. Switch EC does not drop out immediately, being delayed by the discharge of condenser QEC for say six seconds. If within that time switch VDS operates to initiate dispatching, the engagement of contacts VDS1 reconnects the coil of switch EC to the supply lines. Under such conditions a car may be said to be on time. However, if the dispatching operation is not initiated within that interval, the car is early and switch EC is permitted to drop out. Contacts VDE1 prevent an unwanted drop out of switch EC in case of a detent at the lower terminal. If the car does not arrive at the upper terminal by the time that the dispatching operation is initiated, late car switch LC is deenergized. This is due to the fact that contacts VRS2, YVT3 and VHR1 are all separated under the conditions assumed so that the separation of contacts VDS2 as the dispatching operation is initiated breaks the circuit for the coil of switch LC. Contacts VDE2 cause dropping out of switch LC in case of a detent at the lower terminal.

The operation of the early and late car switches controls the operation of rotary switch ELCR to adjust the dispatching interval to correct the condition. For example, if a car is early and switch EC is dropped out, the engagement of contacts EC1 completes a circuit by way of contacts VD3 and CE1 for early car rotary coil CE. This causes downward movement of the rotary switch brushes one step. The resultant engagement of brush IAB with contact IAC2 increases the amount of resistor RVTC1 in the discharge circuit for condenser QVTC, thus reducing the dispatching interval. If a car is late and switch LC is dropped out, the engagement of contacts LC1 completes a circuit by way of contacts VD3 and CL2 for late car rotary coil CL. This causes upward movement of the rotary switch brushes one step. This decreases the amount of resistor RVTC1 in the discharge circuit for condenser QVTC, thus increasing the dispatching interval.

It is to be noted that with the arrangement illustrated the interval may be increased several steps from that obtained for avearge balanced traffic conditions, an additional step each time a car is late. However, the interval is decreased only one step below average balanced traffic position, this decreased interval being a minimum time for satisfactory service for the particular building. If another car comes in early at the upper terminal, a car is taken out of service. The minimum time interval is put in effect by movement of brush IAB into engagement with contacts IAC2. When another car is early, brush IAB is moved into engagement with contact IAC1. This does not further shorten the interval but the engagement of brush CCOB with contact CCOC1 completes a circuit through contacts VUD1 for the coil of car out switch CO. This switch engages contacts CO1 which completes a circuit for the coil of auxiliary motor generator cut-out switch MGX for a car which is at the lower terminal, indicated by the engagement of contacts VB1 for that car, which has not been selected, indicated by the engagement of contacts WB1 for that car, and for which the time interval for discharging passengers has expired as indicated by the engagement of contacts NT1 for that car. Assuming this to be car $a$, the circuit is completed by way of contacts CO1, WB1$a$, VB1$a$, NT1$a$, MGX1$b$, MGX1$c$, MGX1$d$ and MGS1$a$ for the coil of switch MGX$a$. The MGX1 contacts in this circuit and the corresponding contacts in the circuits for the coils of the other MGX switches are to prevent the operation of more than one MGX switch in the event that more than one car fulfills these conditions. Switch MGX$a$ operates to engage contacts MGX1$a$, establishing a holding circuit. It also engages contacts MGX5$a$ to complete a circuit by way of contacts WUD6$a$ and XMG1$a$ for the coil of motor generator cut-out switch MGS$a$. This switch operates to shut down the motor generator set for car $a$, taking the car out of service. It also engages contacts MGS2$a$ to establish a self holding circuit. Switch MGX$a$ also engages contacts MGX6$a$ to complete a circuit for the coil of rotary reset switch RES. This switch engages contacts RES1 completing a circuit through brush RB, contact RC1 and contacts CL1 and CL2 for the coil CL, causing the stepping of rotary switch ELCR back to balanced position. The coil of switch CO is maintained energized by way of contacts CO2, thus insuring the reset of the rotary switch. The reset of the rotary switch breaks the circuit for the coil of switch CO, causing the separation of contacts CO1 and thus the breaking of the circuit for the coil of switch MGX$a$. The resultant separation of contacts MGX6$a$ breaks the circuit for the coil of switch RES. Should cars continue to come in early, switch CO is operated in a similar manner to take another car out of service.

When, with one or more cars out of service, cars come in late, the rotary switch is stepped upwardly, one step for each late car. If the resultant increase in dispatching interval does not correct this condition, upon the engagement of brush CCOB with contacts CCOC7, a circuit is completed for the coil of car in switch CI. This switch engages contacts CI3 to complete a circuit for the coil of in service motor generator switch XMG for a car out of service to restore the car to service. Assume for example that cars $a$ and $b$ have been automatically removed from service. Under such conditions the engagement of contacts CI3 completes a circuit for the coil of the XMG switch for car $a$ or $b$, the XMG switches being arranged to have different operating speeds to insure operation of but one of them. Assuming this to be for car $a$, the circuit extends by way of contacts XMG3$b$, XMG3$c$, XMG3$d$ and MGS3$a$ for the coil of switch XMG$a$. This switch operates to separate contacts XMG4$a$ to prevent the operation at this time of switch XMG$b$. It also separates contacts XMG1$a$ to break the circuit for the coil of switch MGS$a$, causing this switch to drop out and thus restart the motor generator set for car $a$ and restore the car to the dispatching system. Switch MGS$a$ also separates contacts MGS3$a$ but this is without effect as these contacts are by-passed by contacts XMG3$a$. Switch XMG$a$ also engages contacts XMG2$a$ to complete the circuit for the coil of switch RES. This switch engages contacts RES1 to complete a circuit through brush RB and contacts RC7 for coil CE to cause the rotary switch brushes to be restored to neutral positions. The coil of switch CI is maintained energized by way of contacts CI1 until neutral position is reached, thus insuring the reset of the rotary switch. If cars continue to come in late and switch CI is reoperated, car $b$ is returned to service in a similar manner.

When a car is automatically removed from service the operation of its switch MGS separates its contacts MGS4 for that car. Assume that car $a$ is the one which has been removed from service, contacts MGS4$a$ separate so that one circuit for maintaining the coil of switch CC energized is broken. Thus if no landing call is in registration so that contacts BLX3 are separated and this condition is maintained for a certain time interval determined by the charge on condenser QCC, switch CC drops out. This switch engages contacts CC2 to complete a circuit for the coil of switch WUP, causing the system to be thrown over to the up peak program. It also separates contacts CC3 in the circuit for the coil of switch VCC so that if switch CC is not reoperated within the additional time interval provided by condenser QVCC, switch VCC drops out to engage contacts VCC3 completing a circuit for the coil of switch VN, and the system is returned to the intermittent operating program.

Assume now that after the system has been returned to the intermittent program, two landing calls are registered. Switch DCC is set to operate when two landing calls are in registration. Thus under the conditions assumed both of switches BLX and DCC are operated so that both contacts DCC1 and BLX2 are separated, disconnecting the coil of timed transfer relay TT from the feed lines. This relay does not drop out immediately, being delayed by the discharge of condenser QTT. If two landing calls remain unanswered for a certain period of time, switch TT drops out to engage contacts TT1, completing a circuit by way of contacts BLX3 for the coil of switch CC. Also a circuit is established for the coil of switch CC if a greater number of landing calls are registered, say four, to cause the operation of switch HCC. This switch engages contacts HCC1 immediately to establish a circuit for the coil of switch CC by way of contacts BLX3. Contacts DLS3 also establish a circuit for the coil of switch CC if a car comes down to the main landing with a load at or above a certain amount. Switch CC operates as previously explained to change over the operation of the system from the intermittent to the up peak program. As soon as conditions warrant as evidenced by the operation of switch WH as previously explained, the system is thrown over to the balanced interim program.

Assume now that the system is on the balanced interim program and that all cars are in service. With proper interval adjustment based on car arrivals at the upper terminal and with substantially equal traffic in both directions, the cars should on the average arrive on time at the bottom terminal. However, traffic conditions vary, causing the cars to arrive early or late at the bottom terminal. Should down service demand become greater than up service demand, more time is consumed on a downward trip, while should up service demand become greater than down service demand, more time is consumed on an upward trip. Thus, if the cars arrive late at the bottom terminal, it is an indication of more down traffic than up traffic; while if the cars arrive early, it is an indication of more up traffic than down traffic. If either of these conditions persists, the system is thrown to an operating program for taking care of the changed operating conditions.

The earliness and lateness of the cars is measured through the control of lobby time switches VLT and VLX. When a car is selected for dispatching at the bottom terminal, switch VL is deenergized and hence contacts VL1 and VL2 are separated. The separation of contacts VL1 disconnects the coil of switch VLT from the feed lines but the switch does not drop out immediately due to the charge on condenser QVLT which maintains the switch operated for about three seconds. Contacts VL2 similarly disconnect the coil of switch VLX from the feed lines but condenser QVLX maintains switch VLX operated for approximately ten seconds. If the dispatching operation is initiated while switch VLT is still operated, a car is considered late while if it is initiated after switch VLX drops out, a car is considered early. If the dispatching operation is initiated after switch VLT drops out but before switch VLX drops out, a car is considered on time. Such late and early cars are counted and balanced against each other and when the predominance of one over the other reaches a certain amount, the system is thrown to another operating program. This is effected through the control of rotary switch LELCR.

Assume that the car next to be dispatched does not arrive at the bottom terminal in time to effect the dropping out of switch VLT before the dispatching operation is initiated. Under such conditions, contacts VLT1 are engaged, and incident to the initiation of the dispatching operation contacts VUA1 and YVT4 are engaged. This completes a circuit for the coil of lobby late car switch LCL. Switch LCL operates to engage contacts LCL1 to complete a circuit for lobby late car rotary coil CLL. The circuit for the coil of switch LCL is broken incident to the dispatching of the car. Thus contacts LCL1 separate with the result that the rotary switch LELCR is notched one step upwardly. Each time a car is late, the rotary switch is notched upwardly another step until there have been a given number of steps, illustrated as four, whereupon a circuit is completed through brush TB for the coil of heavier down operating switch HD. This switch, upon operation, engages contacts HD4, completing a circuit through contacts WUD7, XHH3 and WUU5 for the coil of automatic down interim switch WDD. Switch WDD engages contacts WDD1 to complete a circuit for the coil of down interim traffic switch VDD, throwing over the system to the heavier down interim program. Upon stepping upwardly, switch LELCR causes operation of late car position switch L. This switch engages contacts L1. Thus the engagement of contacts HD1 upon operation of switch HD completes a circuit for the coil of lobby car reset switch WRE. This switch is delayed in operation by the effect of resistor RWRE and condenser QWRE. Upon operation it engages contacts WRE1 to establish a holding circuit. It also engages contacts WRE2 to complete a circuit by way of contacts L2, CEL2 and CEL1 for rotary coil CEL which operates to return the rotary switch to neutral position, in which it is illustrated. As it reaches neutral, the circuit for the coil of switch L is broken and this switch drops out to break the holding circuit for the coil of switch WRE and the circuit for rotary coil CEL.

Assume now that with rotary switch LELCR in neutral, the dispatching operation is not initiated until after switch VLX drops out, in other words that a car is early. Under such conditions, the engagement of contacts VLX2 completes a circuit through contacts VUA2 for the coil of early car lobby switch ECL. This switch operates to engage contacts ECL1 to complete a circuit for lobby early car rotary coil CEL and, as the circuit for the coil of switch ECL is broken incident to the dispatching of the car, the resultant separation of contacts ECL1 causes notching of rotary switch LELCR one step downwardly.

Each time a car is early, the rotary switch is notched downwardly another step until finally a circuit is completed by way of brush TB for the coil of heavier up operating switch HU. This switch upon operation engages contacts HU5, completing a circuit through contacts WUD7, XHH3 and WDD4 for the coil of automatic up interim switch WUU. Switch WUU engages contacts WUU2 to complete a circuit for the coil of up interim traffic switch VUU, throwing over the system to the heavier up interim program. Early car position switch E is operated upon the first down notching step so that the engagement of contacts HU1 completes a circuit through contacts E1 for the coil of reset switch WRE, causing energization of coil CLL to restore the rotary switch to neutral.

The relationship of up traffic to down traffic may manifest itself in other ways than the early or late arrival of the cars at the lobby floor. For example, should a car arrive at the main floor on its downward trip with a considerable load, this is an indication of heavy down traffic. Assuming this to be car a, contacts LWa are closed under such conditions, completing a circuit for the coil of switch LWSa. This switch engages contacts LWS2a, completing a circuit by way of contacts ML2a and DN2a for the coil of down load switch DLS. This switch engages contacts DLS4 to complete a circuit for the coil of switch LCL, causing upward notching of rotary switch LELCR one step for each so loaded car. Similarly, the loading of a car at the lobby floor to an amount to cause the engagement of load contacts LW for that car is an indication of heavy up traffic. Assuming this to be car a, contacts LWa cause operation of switch LWSa which engages contacts LWS2a to complete a circuit for the coil of up load switch ULS. This switch engages contacts ULS3 to complete a circuit for the coil of switch ECL, causing downward notching of rotary switch LELCR one step for each so loaded car.

If a car is considerably late in arriving at the bottom terminal, this is a further indication of increase in down traffic. Under such conditions, the rotary device is stepped upwardly one notch for each so late car. This is effected by contacts YVT4 which reengage at the end of half a timing interval to cause reoperation of switch LCL. Thus a car that is so late as to cause reoperation of switch LCL by contacts YVT4 is in effect counted as two late cars.

It will be understood that, due to fluctuating traffic conditions, there may be operations of switch ECL following those of switch LCL, and vice versa. Thus whereas, for example, there may be a stepping operation of rotary switch LELCR due to a late car, if the next car is early the switch is stepped back one step, in effect cancelling the effect of the late car. In other words the operations of switches ECL and LCL are counted off against each other so that when one predominates over the other with reference to neutral position the predetermined number of steps, an operation of the appropriate switch HU or HD takes place to automatically change the program.

So far in discussing the operation of switches ECL and LCL, it has been assumed that there was insufficient down call seconds accumulation to cause operation of switch WM or of both switches WM and WH. Swith WM is preferably set to operate at about half the down call seconds accumulation for which switch WH is set. When switch WM operates, it engages contacts WM3, rendering the circuit through contacts E2 and VLX1 effective to control the operation of switch LCL. Since, under the conditions with contacts VLT1 separated and contacts VLX1 engaged, a car is said to be on time, a circuit is provided for causing an operation of switch LCL under conditions where switch LELCR is positioned below neutral so as to cause contacts E2 to be engaged, where switch WM is operated indicative of medium heavy down call accumulation and where switch VLX is operated and switch VLT is dropped out, indicative of a car on time. Thus under such conditions, coil CLL is energized and the rotary switch is notched one step upwardly, subtracting from the downward notching steps previously effected. It is to be noted that under such conditions an on time car is not effective to notch in the up direction above neutral as switch E is not operated. However it is effective to notch above neutral in the down direction under conditions where a car is on time and there is not heavy down call seconds accumulation. The circuit for this operation is through contacts L3 indicative of the rotary switch brushes above neutral, contacts WH2 indicative of lack of heavy down call seconds accumulation and contacts VLX2 which with contacts VLX2 separated is indicative of a car being on time. Thus, under such conditions, coil ECL is energized and the rotary switch is notched one step downwardly, subtracting from the upward notching steps previously effected. An on time car is not effective under such conditions to notch in the down direction below neutral as switch L is not operated. Also an on time car is ineffective to notch in the down direction either above or below neutral under conditions of heavy down call seconds accumulation as contacts WH2 are separated.

In summarizing these last described operations and referring for convenience to early, late or on time cars, although it is to be understood that other conditions indicative of increase or decrease of traffic in one or the other direction are included, early and late cars are balanced against each other under all conditions. Under conditions of heavy down call seconds accumulation, an on time car is considered as a late car and subtracted from an early car when early cars are in predominance. When there is only medium down call seconds accumulation, an on time car is considered as an early car and subtracted from a late car when late cars predominate and as a late car and subtracted from an early car when early cars predominate. When there is less than medium down call seconds accumulation, on time cars are counted as early cars when there is an accumulation of late cars. When under any of these conditions the overbalance reaches a certain amount the appropriate heavier up or heavier down switch HU or HD is operated to change the traffic program.

It has been pointed out that where there is a certain increase in down traffic a change is automatically effected from the balanced interim program to the heavier down program and where there is a certain increase in up traffiic a change is automatically effected from the balanced interim program to the heavier up program. Similar changes are made from other program settings. Assume that the system has been thrown from the balanced program to the heavier up program. Incident to this operation switch WRE is operated as above described to return rotary switch LELCR to neutral. When thereafter there is a sufficient overbalance of late cars to cause operation of switch HD, the engagement of contacts HD3 completes a circuit by way of contacts WUD8 and WUU3 for the coil of balanced interim traffic switch XHH. This switch operates to separate contacts XHH3 breaking the circuit for the coil of switch WUU which drops out, throwing the system to the balanced program. At the same time the separation of these contacts prevents the establishment of an unwanted circuit for the coil of switch WDD through contacts HD4 as contacts WUU5 reengage. Switch XHH also engages contacts XHH1 to by-pass contacts WUU3 to insure sufficient duration of operation of switch XHH to effect the above described operation. Incident to this operation, switch WRE is operated to restore the rotary switch to neutral position as previously described.

If after the system has been thrown to the balanced program there occurs another overbalance of late cars to cause the operation of switch HD, the system is thrown to the heavier down program as previously described. Again switch WRE is operated to restore the rotary switch to neutral position. If again there is an overbalance of late cars to cause the reoperation of switch HD the system is thrown to the down peak program. This is due to the fact that when switch HD dropped out, upon the return of the rotary switch to neutral after the system has been thrown to the heavier down program, the reengagement of contacts HD5 completed a circuit through contacts WUD8, XHH3, WDD5 and HD5 for the lower coil of heavy interim transfer switch WHH. This switch engages contacts WHH2 so that upon the engagement of contacts HD2 as a result of the reoperation of switch HD the circuit is completed through contacts WDD2 and TTR2 for the upper coil of automatic down peak switch WDP. Switch WDP upon operation separates contacts WDP5 to break the circuit for the coil of switch WUD, this switch dropping out to separate contacts WUD1, WUD3 and WUD7. This causes the dropping out of switches VU and VUD to remove the system from the heavier down program. Contacts WUD7 are by-passed by contacts WDP3 which, together with contacts VU1 engaged as a result of the dropping out of switch VU, causes switches VD and VDP to be operated to place the system on the down peak program. Switch WHH also engaged contacts WHH4 to maintain the switch operated after separation of contacts HD5 upon reoperation of switch HD to throw over to the down peak program. Thus switch WHH is maintained operated until switch WUD drops out and thus contacts WHH1 are maintained engaged until contacts WUD4 engage to establish another circuit for the coil of switch WDP.

Thus it is seen that in response to a predetermined increase in the ratio of down traffic to up traffic conditions, the system may be thrown from any one of the heavier up, balanced or heavier down programs to the next program to provide more service for down traffic than for up traffic. Similarly, in response to a predetermined increase in the ratio of up traffic to down traffic conditions, the system may be thrown from any one of the heavier down, balanced or heavier up programs to the next program to provide more service for up traffic than for down traffic. Assume that, for example, the system is on the heavier down program and that there is sufficient overbalance of early cars to cause operation of switch HU. The engagement of contacts HU3 completes a circuit through contacts WUD8 and WDD3 for the coil of switch XHH. This switch operates to engage contacts XHH2 to by-pass contacts WDD3 and to separate contacts XHH3 to break the circuit for the coil of switch WDD. Switch WDD drops out to separate contacts WDD1, breaking the circuit for the coil of switch VDD which in turn drops out, thus returning the system to the balanced program.

It has already been shown how the system is thrown from the balanced program to the heavier up program. If cars continue to come in early when on the heavier up program, the system is automatically thrown to the up peak program. When switch HU dropped out upon the system being thrown to the heavier up program, contacts HU4 completed the circuit for the upper coil of switch WHH. Thus, upon reoperation of switch HU due to continued earliness of cars, a circuit is completed by way of contacts WHH1, HU2, WUU1 and TTR1 for the coil of switch WUP. Switch WUP separates contacts WUP6 to break the circuit for the coil of switch WUD which drops out to cause deenergization of switches VD and VUD. The engagement of contacts WUP1 and VD1 causes switches VUP and VU to be operated, placing the system on the up peak program. Contacts WDP1 and WUP4 prevent unwanted operation of switches WUP and WDP respectively upon dropping out of switch WUD in the above described operations. Contacts WUP5 act to enable the return of rotary switch ELCR to neutral when the system is thrown to the up peak program as above described.

It is preferred when on either peak program to return to the balanced program rather than to the heavier program corresponding to the direction of the peak. It has already been shown how, when on the up peak program and the ratio of up traffic to down traffic decreases, the system is thrown directly to the balanced program. When on the down peak program and the ratio of down traffic to up traffic decreases, the system is thrown directly to the balanced program. This is effected through the control of switch TTR by the down call accumulative circuits. When the system is on the down peak program, contacts WDP2 are separated so that after the down call seconds accumulation time is less than that to maintain switch WM operated so that contacts WM1 are separated and the cars are not coming into the lobby floor sufficiently loaded to cause contacts DLS1 to be engaged, the circuit is broken for the coil of switch TTR. If this condition persists for the time delay period of switch TTR, this switch drops out to separate contacts TTR2, breaking the circuit for the upper coil of switch WDP. This switch drops out to engage contacts WDP5, completing the circuit for the coil of switch WUD. This switch engages contacts WUD1, WUD3 and WUD6 to return the system to the balanced program.

When on the balanced program, a condition arises where there are no landing calls to be answered, contacts BLX3 separate so that, if this condition persists for a certain time interval, switch CC drops out. This switch acts to change over to the up peak program. It also acts through switch VCC as previously explained to cause operation of switch VN, returning the system to the intermittent program, shifting down the motor generator sets for cars $b$, $c$ and $d$ and also for car $a$ if, when it arrives at the bottom terminal, no call to which car $a$ is subject is in registration for the duration of the time interval of relay ERT$a$.

There are many buildings, to the elevator systems of which automatic program selection is applicable, in which peak traffic conditions occur at definite times. For such installations, it is preferred to anticipate the peak conditions and throw the system over automatically to the proper program just before the peak occurs. Such an arrangement has been illustrated as in the form of clock operated switches, the contacts of which are designated 1CK and 2CK. Contacts 1CK are utilized to throw over to the up peak program at a specified time in the morning and contacts 2CK are utilized to throw over to the down peak program at a specified time in the evening. These contacts are rendered effective by placing knife switches CDS in the positions opposite to those illustrated.

Considering first contacts 1CK, upon the arrival of the time for which the clock is set, say 8:40 in the morning, contacts 1CK close to complete a circuit for the lower coil of switch WUP, provided there is a demand for service and the car is in operation, indicated by the engagement of contacts BLX1 and BZ1. This causes operation of switch WUP to throw the system to up peak operation and also to engage contacts WUP3 to by-pass contacts BZ1 and BLX1. The set (upper) coil of day program selection switch XWD is connected in parallel with the coil of switch WUP and is operated at the same time, latching itself in operated condition. Contacts 1CK are set to open after the up peak normally expires, say 9:05. If at that time traffic conditions are such that switch WH has operated to cause the operation of switch WUD and thus the system to be thrown to the balanced program, the consequent engagement of contacts WUD9 completes a circuit through contacts XWD2 for the lower coil of day program switch WD. This switch operates to engage contacts WD3 to by-pass contacts WUD9. It also engages contacts WD4 which with switch CDS1 in the right hand position maintains switch CC operated and thus prevents return of the system to the intermittent program once it has been determined that it is a working day, as indicated by the operation of switch WD, until it has passed through down peak operation as will be explained later. If contacts VCC1 or CC1 are not engaged when switch WUP drops out, switch WUD and thus switch WD is not operated. Thus, with this arrangement, the system automatically distinguishes between working days and non-working days. If the system goes from the up peak program to balanced interim program, which would be the normal operation on working days, switch WD is operated. If not, switch WD is not operated, indicating a non-working day and enabling the return of the system to the intermittent program.

Upon the arrival of the time, say 4:45 in the evening, for which the clock is set, contacts 2CK close. This completes a circuit through contacts WD2 for the upper coil of switch WD to maintain the switch operated. It also completes a circuit through contacts XWD1 for the reset (lower) coil of switch XWD, causing this switch to be reset. It also completes a circuit by way of contacts WD2 and knife switch TCO for the lower coil of switch WDP, causing the system to be thrown to the down peak program. With switch TCO open, this circuit is subject to contacts WM2 so that the throwing over to the down peak program by the clock is also subject to a medium down call accumulation time. Switch TCO is included to illustrate either operation. Contacts DLS2 enable the system to go on the down peak program even though switch WD is not operated. At the expiration of the clock period, say at 5:15 p.m., contacts 2CK open to break the circuit for the lower coil of switch WDP and if the upper coil is not energized, switch WDP drops out to return the system to the balanced interim program. If there is still sufficient down service demand to maintain the upper coil energized, switch WDP is maintained energized until the peak subsides, whereupon the system is returned to the balanced and finally to the intermittent program as previously described. If at the time of opening of contacts 2CK, switch CC has dropped out, the system is not thrown to the balanced program but directly from the down peak to the up peak program and thence to the intermittent program.

From the above description it will be seen that there is provided an elevator dispatching and control system in which the program is automatically selected best to suit the service demand and traffic conditions. When the system is on the intermittent program and up traffic conditions increase to warrent the change, as during the morning peak, the system automatically throws over to the up peak program. When there is sufficient increase in down service demand to warrant a change and the up peak subsides, the system automatically throws over to the balanced program. From the balanced program, upon an increase in down traffic, as during the outgoing lunch period, the system automatically throws over to the heavier down program and then back to the balanced program as the down traffic subsides. Then upon an increase in up traffic, as during the end of the lunch period, the system automatically throws over to the heavier up program and then back to the balanced program as the up traffic subsides. Where down traffic increases sufficiently, as upon the onset of the evening outgoing peak, the system automatically throws over to the down peak program, preferably going through the heavier down program to take care of the build up to down peak conditions. From the down peak program, the system is automatically returned to the balanced program as the peak subsides and finally to the intermittent program as the building becomes depopulated, omitting the balanced program if calls fall off precipitately.

The system is flexible in that, should traffic conditions change sufficiently at other times of the day, it automatically throws over to the program best suited to serve those conditions. For example, whenever the system is operating under the intermittent program and there is service demand to cause the dropping out of switch TT, the system is automatically thrown over to the up peak program to provide more cars to take care of increased traffic. Also, the system may throw over to the down peak program for the beginning of the lunch period and to up peak program at the end of the lunch period, if traffic conditions warrant. Where the system is on an interim program and there is an increase in up traffic over down traffic, the following program changes may be made: from the heavier down program to the balanced program, from the balanced program to the heavier up program, and from the heavier up program to the up peak program. If the increase is in down traffic over up traffic, the following program changes may be made: from the heavier up program to the balanced program, from the balanced program to the heavier down program, and from the heavier down program to the down peak program. The system is automatically thrown from the up peak program to the balanced program when the up peak subsides and the down service demand becomes sufficient, and from the down peak program to the balanced program when the down peak conditions subside. Also, it is automatically thrown from the balanced program to the intermittent program when the service demand is so infrequent as to render time dispatching unwarranted.

The ratio of traffic in one direction to that in the other is measured by whether a car in arriving at the bottom terminal is late or early with respect to the initiation of the dispatching operation. When there is a certain overbalance of late cars, the system is thrown to a program to provide more down service and, when there is a certain overbalance of early cars, the system is thrown to a program to provide more up service. Late cars and early cars are counted off against each other in determining when such an overbalance is reached. When there is medium down call seconds accumulation, on time cars are considered as late cars and subtracted from early cars when early cars predominate and as early cars and subtracted from late cars when late cars predominate. When there is heavy down call seconds accumulation, on time cars are considered late cars and subtracted from early cars when early cars predominate. When there is light down call seconds accumulation, on time cars are considered early cars and subtracted from late cars when late cars predominate.

The system may be arranged to anticipate peak conditions as by a clock. Also whether it is a working day or non-working day is determined by whether the system is thrown to the balanced program when the up peak subsides. On a working day, the system is not thrown back to the intermittent program until after the down peak is over and the building has become depopulated.

The dispatching intervals are adjusted in accordance with whether the cars are early or late in arriving at the upper terminal. This enables the lateness or earliness of arrival of the cars at the lower terminal to serve as a measure of traffic conditions. When the cars continue to arrive early at the upper terminal when on the minimum interval, cars are automatically removed from service and their motor generator sets shut down until this condition is corrected. Also, when one or more cars arrive late at the upper terminal and the increase in dispatching interval does not correct this condition, cars are automatically returned to service, starting up their motor generator sets automatically. When on the intermittent program, all motor generator sets are shut down except where there is a demand for service in which event the motor generator set for the intermittent service car is automatically started in operation. Also, when the system is thrown to the up peak program the motor generator sets for the other cars are automatically started in operation.

While the invention is particularly applicable to installations in which the elevators are operated without attendants on the cars, it is also applicable to installations utilizing attendants and to those in which both arrangements are provided. Also, it is applicable to installations for buildings other than office buildings and to other forms of dispatching and control systems. In addition, while the invention has been described as applied to a system in which, during the interim period between the up and down peaks, three operating programs are provided, other arrangements may be utilized as for example where the heavier up and heavier down interim programs are omitted. Operations under the different programs may vary. For example, operation under the intermittent program may be as disclosed for "on call" operation in the co-pending application of William Frank Glaser, Serial Number 304,163, filed August 13, 1952, for Elevator Control System. A different number of early cars may be utilized to cause the automatic removal of a car from service. Traffic conditions may be measured in other ways, as by measuring the down trip times and the up trip times. Even where a clock is employed, the system may be arranged to return to the intermittent program, if conditions warrant, before the clock period expires, as by connecting a making contact of switch CC in series with clock contacts 2CK.

Various circuit alterations may be made and the operations described may be obtained in other ways. For example, insead of utilizing the load in the car at the lobby floor to indicate up peak conditions the number of car calls could be utilized, as by providing a switch for each car having its coil in a circuit common to the car buttons for that car and operable when a certain number of car calls is registered to throw over to the up peak program. Instead of the clock controlled arrangements illustrated, clocks which differentiate Saturday and Sunday from working days could be utilized. Either or both of contacts BZ1 and BLX1 may be omitted. With both of these contacts omitted, the clock is effective to switch over to the up peak program regardless of service demand or car operating conditions. Also, contacts WH1 may be arranged to by-pass contacts TTR1 instead of controlling the circuit for the coil of switch TTR.

It is not intended to set forth all the variations that may be made, but it is contemplated that many of the features of the invention disclosed may be carried out in other ways and may be used in connection with apparatus and circuits different from those specifically described and that many apparently widely different embodiments of the invention can be made without departure from the spirit and scope of the invention. It is therefore intended that all matter contained in the above description or shown in the accompanying drawings shall be interpreted as illustrative and not in a limiting sense.

What is claimed is:

1. In a dispatching and control system for a plurality of elevator cars, means for causing dispatching of the cars from a given terminal under a certain program, means for causing dispatching of the cars from said terminal under another program, means operable to initiate dispatching of the cars from said terminal under one or the other of said programs, means for determining the ratio of up traffic to down traffic, and means controlled by said ratio determining means for automatically selecting the program under which the cars are dispatched.

2. In a dispatching and control system for a plurality of elevator cars, means for determining whether cars are early or late in arriving at a dispatching floor, means for causing said cars to be operated in accordance with a first preestablished dispatching program, means for causing said cars to be operated in accordance with a second preestablished dispatching program, and means controlled by said early or late car determining means for causing operation of elevators operating in accordance with one of said programs to be automatically changed to operation in accordance with the other of said programs.

3. In a dispatching and control system for a plurality of elevator cars having a program to suit a certain relationship of up to down traffic conditions and another program to suit a different relationship of up to down traffic conditions, means operable on a time basis to initiate dispatching of the cars from a given terminal under one or the other of said dispatching programs, means for determining whether the cars are early or late in arriving at said terminal with respect to the initiation of the dispatching operations, and means controlled by said means for determining the earliness or lateness of the cars for selecting the program under which the cars are dispatched.

4. In a dispatching and control system for a plurality of elevator cars, means for causing dispatching of the cars under a program to suit a certain relationship of up to down traffic conditions, means for causing dispatching of the cars under a program to suit a different relationship of up to down traffic conditions, means operable on a time basis to initiate dispatching of the cars from both terminals under one or the other of said dispatching programs, means for each terminal for determining whether the cars are early or late in arriving at that terminal, means controlled by said means for determining the earliness or lateness of arrival of the cars at one of the terminals for determining the dispatching interval, and means controlled by said means for determining the earliness or lateness of arrival of said cars at the other of the terminals for selecting the program under which the cars are dispatched.

5. In a dispatching and control system for a plurality of elevator cars, means for causing dispatching of the cars under a program to provide substantially equal up and down service, means for causing dispatching of the cars under a program to provide greater service in the up direction than in the down direction, means for causing dispatching of the cars under a program to provide greater service in the down direction than in the up direction, means for providing time intervals for dispatching, means operable on a time basis subject to said time interval means to initiate dispatching of the cars under said dispatching programs, means for each terminal for determining whether the cars are early or late in arriving at that terminal with respect to the initiations of the dispatching operations for that terminal, means controlled by said means for determining the earliness or lateness of arrival of the cars at the upper terminal for adjusting the timing interval provided by said time interval means, means responsive to said means for determining the earliness or lateness of arrival of the cars at the bottom terminal under conditions where a predetermined number of said cars arrive early at the bottom terminal for changing over from the substantially equal up and down service program to the program for providing more service in the up direction, and means responsive to said means for determining earliness or lateness of arrival of the cars at the bottom terminal under conditions where a predetermined number of said cars arrive late at the bottom terminal for changing over from the substantially equal up and down service program to the program for providing more service in the down direction.

6. In a dispatching and control system for a plurality of elevator cars, means for causing the dispatching of the cars to be under a program suited for substantially equal up and down traffic, means for causing the dispatching of the cars to be under a program suited for more traffic in the up direction than in the down direction, means for causing the dispatching of the cars to be under a program suited for more traffic in the down direction than in the up direction, means for determining the ratio of up traffic to down traffic, and means controlled when operating under the program for substantially equal up and down traffic by said ratio determining means upon a predetermined change in the ratio of up traffic to down traffic for changing to the program suitable for the direction of predominant traffic.

7. In a dispatching and control system for a plurality of elevator cars, means for causing the dispatching of the cars to be under a program suited for substantially equal up and down traffic, means for causing the dispatching of the cars to be under a program suited for more traffic in the up direction than in the down direction, means for causing the dispatching of the cars to be under a program suited for more traffic in the down direction than in the up direction, means for determining the ratio of up traffic to down traffic, and means controlled by said ratio determining means for selecting the program suitable for the particular traffic conditions.

8. In a dispatching and control system for a plurality of elevator cars, means for causing the dispatching of the cars to be under a program to provide the same number of cars on the up trip as on the down trip, means for causing the dispatching of the cars to be under a program to provide more cars on the up trip than on the down trip, means for causing the dispatching of the cars to be under a program to provide more cars on the down trip than on the up trip, means for determining the ratio of up traffic to down traffic, and means controlled by said ratio determining means for causing operation under the program to provide the same number of cars on the up trip as on the down trip under conditions where up and down traffic are substantially equal, for causing operation under the program to provide more cars on the up trip than on the down trip under conditions where up traffic predominates, and for causing operation under the program to provide more cars on the down trip than on the up trip under conditions where down traffic predominates.

9. In a dispatching and control system for a plurality of elevator cars, means for causing the dispatching of the cars to be such as to provide up service and down service in a certain ratio, means for causing the dispatching of the cars to be such as to provide an increased ratio of up service to down service, means for determining when the cars are early in arriving at the bottom terminal, and means responsive to said determining means upon the early arrival of the cars at the bottom terminal for changing from said certain ratio to said increased ratio of service.

10. In a dispatching and control system for a plurality of elevator cars, means for causing the dispatching of the cars to be such as to provide up service and down service in a certain ratio, means for causing the dispatching of the cars to be such as to provide an increased ratio of down service to up service, means for determining when the cars are late in arriving at the bottom terminal, and means responsive to said determining means upon the late arrival of the cars at the bottom terminal for changing from said certain ratio to said increased ratio of service.

11. In a dispatching and control system for a plurality of elevator cars, means for causing the dispatching of the cars to be under a program to provide a balance in the number of cars on the up trip and the down trip, means for causing the dispatching of the cars to be under a program to provide more cars on the up trip than on the down trip, means for causing the dispatching of the cars to be under a program to provide more cars on the down trip than on the up trip, means for initiating the dispatching of the cars from the lower terminal on a time basis, means for determining whether the cars are early or late in arriving at said lower terminal with respect to the initiations of the dispatching operations for that terminal, and means responsive to said early or late car determining means upon the earliness or lateness of arrival at the lower terminal of a given number of cars for automatically changing from the program under which operating to a program to provide more service in the up direction under conditions where the cars are early and to a program to provide more service in the down direction under conditions where the cars are late.

12. In a dispatching and control system for a plurality of elevator cars, means for causing the dispatching of the cars to be under a program to provide balanced service for the up and down directions, means for causing the dispatching of the cars to be under a program to provide more service in the up direction, means for causing the dispatching of the cars to be under a program to provide more service in the down direction, means for causing the dispatching of the cars to be under a program to provide peak service in the up direction, means for causing the dispatching of the cars to be under a program to provide peak service in the down direction, means for determining the ratio of up traffic to down traffic, and means controlled by said ratio determining means for automatically selecting that one of said programs best suited for the particular traffic conditions.

13. In a dispatching and control system for a plurality of elevator cars; means for causing the dispatching of the cars to be under a balanced program to provide equal service for the up and down directions; means for causing the dispatching of the cars to be under a heavier up program to provide greater service in the up direction; means for causing the dispatching of the cars to be under a heavier down program to provide greater service in the down direction; means for causing the dispatching of the cars to be under an up peak program to provide still greater service in the up direction; means for causing the dispatching of the cars to be under a down peak program to provide still greater service in the down direction; means for initiating the dispatching of the cars from the lower terminal on a time basis; means for determining whether the cars are early or late in arriving at the lower terminal with respect to the initiations of the dispatching operations for that terminal; and means responsive to said determining means upon the earliness of arrival at the lower terminal of a given number of cars for automatically changing from the balanced program to the heavier up program, from the heavier up program to the up peak program, and from the heavier down program to the balanced program, and upon the lateness of arrival at the lower terminal of a given number of cars for automatically changing from the balanced program to the heavier down program, from the heavier down program to the down peak program, and from the heavier up program to the balanced program.

14. In a dispatching and control system for a plurality of elevator cars; means for causing the dispatching of the cars to be under a balanced program to provide equal service for the up and down directions; means for causing the dispatching of the cars to be under a heavier up program to provide greater service in the up direction; means for causing the dispatching of the cars to be under a heavier down program to provide greater service in the down direction; means for causing the dispatching of the cars to be under an up peak program to provide still greater service in the up direction; means for causing the dispatching of the cars to be under a down peak program to provide still greater service in the down direction; means for initiating the dispatching of the cars from the lower terminal on a time basis; means for determining whether the cars are early or late in arriving at the lower terminal with respect to the initiations of the dispatching operations for that terminal; means responsive to said determining means upon the earliness of arrival at the lower terminal of a given number of cars for automatically changing from the balanced program to the heavier up program, from the heavier up program to the up peak program, and from the heavier down program to the balanced program, and upon the lateness of arrival at the lower terminal of a given number of cars for automatically changing from the balanced program to the heavier down program, from the heavier down program to the down peak program, and from the heavier up program to the balanced program; means for registering down service demand; means for registering subsidence of up peak conditions; means responsive when operating under the up peak program to said subsidence registering means and said down service demand registering means whenupon subsidence of up peak conditions there is a certain amount of down service demand for automatically changing over to the balanced program; and means responsive when operating under the down peak program to said down service demand registering means upon a subsidence of down service demand for automatically changing over to the balanced program.

15. In a dispatching and control system for a plurality of elevator cars; means for causing the dispatching of the cars to be under a balanced program to provide equal service for the up and down directions; means for causing the dispatching of the cars to be under a heavier down program to provide greater service in the down direction; means for causing the dispatching of the cars to be under a down peak program to provide still greater service in the down direction; means for initiating the dispatching of the cars from the lower terminal on a time basis; means for determining whether the cars are early or late in arriving at the lower terminal with respect to the initiations of the dispatching operations for that terminal; means responsive to said means for determining the earliness or lateness of arrival of the cars at the lower terminal upon the lateness of arrival at the lower terminal of a given number of cars for automatically changing from the balanced program to the heavier down program, and from the heavier down program to the down peak program; means for registering down service demand; and means responsive when operating under the down peak program to said down service demand registering means upon a decrease of down service demand to a certain amount for automatically changing over to the balanced program.

16. In a dispatching and control system for a plurality of elevator cars, means for causing the dispatching of the cars to be under a balanced program to provide equal service for the up and down directions, means for causing the dispatching of the cars to be under an intermittent program for light traffic conditions, means for causing the dispatching of the cars to be under a down peak program to provide peak service in the down direction, means for determining the ratio of up traffic to down traffic, means controlled by said ratio determining means for causing operation under the balanced program when up traffic and down traffic are substantially equal and under the down peak program when there is a certain predominance of down traffic over up traffic, means for registering service demand, and means responsive to said service demand registering means upon a subsidence of service demand as registered by said registering means for changing from the down peak program to the balanced program in case of a certain decrease in service demand and on to the intermittent program in case of a certain greater decrease in service demand.

17. In a dispatching and control system for a plurality of elevator cars; means for causing the dispatching of the cars to be under a balanced program to provide equal service for the up and down directions; means for causing the dispatching of the cars to be under a heavier up program to provide greater service in the up direction; means for causing the dispatching of the cars to be under an up peak program to provide still greater service in the up direction; means for initiating the dispatching of the cars from the lower terminal on a time basis; means for determining whether the cars are early or late in arriving at the lower terminal with respect to the initiations of the dispatching operations for that terminal; means responsive to said determining means upon the earliness of arrival at the lower terminal of a given number of cars for automatically changing from the balanced program to the heavier up program, and from the heavier up program to the up peak program; means for registering subsidence of up peak conditions; means for registering down service demand; and means responsive when operating under the up peak program to said subsidence registering means and said down service demand registering means under conditions where upon subsidence of up peak conditions there is a certain down service demand for automatically changing over to the balanced program.

18. In a dispatching and control system for a plurality of elevator cars having an intermittent program for light traffic conditions, an up peak program for a large amount of up traffic from the bottom terminal and an interim program for substantial traffic in both directions, means for indicating the registration of a car call for each car, means responsive when operating under said intermittent program to a certain load being taken in a car at the bottom terminal and the registration of a car call for that car for automatically switching over to said up peak program, means for registering a demand for service in the down direction, means for registering subsidence of up peak conditions, and means responsive to said up peak subsidence registering means and said down service demand registering means under conditions where as the up peak subsides there is a certain amount of down service demand for automatically switching over to said interim program.

19. In a dispatching and control system for a plurality of elevator cars having an intermittent program for light traffic conditions, an up peak program for a large amount of up traffic from the bottom terminal and an interim program for substantial traffic in both directions, means operable when operating under said intermittent program for indicating the arrival of up peak conditions, means responsive to operation of said up peak indicating means for automatically switching over to said up peak program, means for registering demand for down service, means for registering subsidence of up peak conditions, and means responsive to said subsidence registering means and said down service demand registering means for automatically switching over to said interim program under conditions where as the up peak subsides a certain down service demand exists but back to said intermittent program under conditions where as the up peak subsides such service demand does not exist.

20. In a dispatching and control system for a plurality of elevator cars, means for providing adjustable time intervals for dispatching, means for initiating the dispatching of the cars on a time basis subject to said time interval means, means for determining whether the cars are early or late in arriving at a certain point, means controlled by said determining means for causing operation of said time interval means to adjust the timing interval in accordance with whether the cars are early or late in arriving at said point, and means responsive after the timing interval has been reduced to a certain amount to said determining means upon the arrival of a predetermined number of early cars at said point for automatically removing a car from service.

21. In a dispatching and control system for a plurality of elevator cars having an interim program and an intermittent program, means for providing adjustable time intervals for dispatching, means for initiating the dispatching of the cars under the interim program on a time basis subject to said time interval means, means for determining whether the cars are early or late in arriving at a certain point, means controlled by said determining means for causing operation of said time interval means to adjust the timing interval in accordance with whether the cars are early or late in arriving at said point, means responsive under conditions where the timing interval has been reduced to a certain amount to said determining means upon the arrival of a predetermined number of early cars at said point for automatically removing a car from service, means for registering demand for service, and means responsive when a car has been removed from service to said service demand means upon a subsidence in the demand for service for automatically changing over from the interim program to the intermittent program.

22. In a dispatching and control system for a plurality of elevator cars, means for providing adjustable time intervals for dispatching, means for initiating the dispatching of the cars from a terminal floor at the expiration of predetermined time intervals provided by said time interval means, means for determining whether the cars are early or late in arriving at said terminal floor with respect to the initiations of the dispatching operations, means responsive to said determining means upon early arrivals of the cars at said terminal floor for causing operations of said time interval means to decrease said interval and upon late arrivals of the cars at said terminal floor to increase said interval, and means responsive after said interval has been decreased to a certain amount to said determining means upon the arrival of an early car at said terminal floor for automatically removing a car from service.

23. In a dispatching and control system for a plurality of elevator cars, means for providing adjustable time intervals for dispatching, means for initiating the dispatching of the cars from a terminal floor at the expiration of predetermined time intervals provided by said time interval means, means for determining whether the cars are early or late in arriving at said terminal floor with respect to the initiations of said dispatching operations, means responsive to said determining means upon early arrivals of the cars at said terminal floor for causing operation of said time interval means to decrease said interval and upon late arrivals of the cars to increase said interval, means responsive after said interval has been decreased to a certain amount to said determining means upon the arrival of an early car at said terminal floor for automatically removing a car from service, means responsive to said car from service removing means upon such removal of a car from service for causing operation of said time interval means to increase said interval to a given amount, and means responsive after said interval again has been decreased to said certain amount to said determining means upon the arrival of an early car at said terminal floor for automatically removing another car from service.

24. In a dispatching and control system for a plurality of elevator cars, means for providing adjustable time intervals for dispatching, means for initiating the dispatching of the cars from the upper terminal at the expiration of predetermined time intervals provided by said time interval means, means for determining whether the cars are early or late in arriving at said upper terminal floor with respect to the initiations of the dispatching operations, means responsive to said determining means upon each early arrival of a car at said upper terminal floor for causing operation of said time interval means to decrease said interval until said interval is reduced to a certain amount, means responsive after said interval has been reduced to said certain amount to said determining means upon the arrival of a certain number of early cars at said upper terminal floor for automatically removing a car from service at the lower terminal floor, means responsive to said car from service removing means upon such removal of a car from service for causing operation of said time interval means to increase said interval to a given amount, and means responsive, after the time of arrival of cars at the upper terminal has again caused said interval to decrease to said certain amount, to said determining means upon the arrival of said certain number of early cars at said upper terminal floor for automatically removing another car from service.

25. In a dispatching and control system for a plurality of elevator cars, means for providing adjustable time intervals for dispatching, means for initiating the dispatching of the cars from a terminal floor on a time basis subject to said time interval means, means for determining whether the cars are early or late in arriving at said terminal floor, means controlled by said determining means for causing operation of said time interval means to adjust the timing interval in accordance with whether the cars are early or late in arriving at said terminal floor, means responsive after said interval has been reduced to a certain amount to said determining means upon the arrival of a certain number of early cars at said terminal floor for automatically removing a car from service, and means responsive when a car has been removed from service to said adjusting means upon an increase in the timing interval to a predetermined amount for automatically restoring the car to service.

26. In a dispatching and control system for a plurality of elevator cars, means for providing adjustable time intervals for dispatching, means for initiating the dispatching of the cars from a terminal floor at the expiration of successive time intervals provided by said time interval means, means for determining whether the cars are early or late in arriving at said terminal floor with respect to the initiations of the dispatching operations for that terminal floor, means responsive to said determining means upon an early arrival of said car at a terminal floor for causing operation of said time interval means to decrease said interval and to a late arrival of a car at said terminal floor to increase said interval, means responsive after said interval has been reduced to a certain amount to said determining means upon the arrival of a certain number of early cars at said terminal floor for automatically removing a car from service and for causing operation of said time interval means to increase said interval to a given amount, and means responsive when a car has been removed from service to said adjusting means upon an increase in the timing interval to a predetermined amount for automatically restoring the car to service.

27. In a dispatching and control system for a plurality of elevator cars, means for providing adjustable time intervals for dispatching, means for initiating the dispatching of the cars from the upper terminal floor at the expiration of predetermined timing intervals provided by said time interval means, means for determining whether the cars are early or late in arriving at said upper terminal floor with respect to the initiations of the dispatching operations for that terminal floor, means responsive to said determining means upon each early arrival of a car at said upper terminal floor for causing operation of said time interval means to decrease said interval until said interval is reduced to a certain amount and upon each late arrival of a car at said upper terminal floor for causing operation of said time interval means to increase said interval until said interval is increased to a certain amount, means responsive after said interval has been reduced to said certain amount to said determining means upon the arrival of a certain number of early cars at said upper terminal floor for automatically removing a car from service at the lower terminal floor, means responsive to said car from service removing means upon such removal of a car from service for causing operation of said time interval means to increase said interval to a given amount, means responsive, after the time of arrival of cars at the upper terminal has again caused said interval to decrease to said certain amount, to said determining means upon the arrival of said certain number of early cars at said upper terminal floor for automatically removing another car from service, and means responsive when one or more cars have been removed from service to said determining means upon an increase in the timing interval to a predetermined amount due to late arrivals of the cars at the upper terminal floor for automatically restoring a car to service at the lower terminal floor.

28. In a dispatching and control system for a plurality of elevator cars in which the hoisting motor for each car is supplied with current from a motor generator set, means for each car for controlling the running of the motor generator set for that car, means for providing adjustable time intervals for dispatching, means for initiating the dispatching of the cars from a terminal floor on a time basis subject to said time interval means, means for determining whether the cars are early or late in arriving at said terminal floor, means controlled by said determining means for causing operation of said time interval means to adjust the timing interval in accordance with whether the cars are early or late in arriving at said terminal floor, means responsive after said interval has been reduced to a certain amount to said determining means upon the arrival of a certain number of early cars at said terminal floor for automatically removing a car from service and for causing operation of the means for controlling the motor generator set for that car to cause shut down of the set, and means responsive when a car has been removed from service to said adjusting means upon an increase in the timing interval to a predetermined amount for automatically restoring the car to service and for causing operation of the means for controlling the motor generator set for that car to cause starting of the set.

29. In a dispatching and control system for a plurality of elevator cars, means including resistance for providing time intervals for dispatching, means for initiating the dispatching of the cars from a given terminal floor at the expiration of successive said time intervals subject to said time interval means, and means for controlling said time interval means to adjust the duration of the timing interval means to adjust the duration of the timing intervals, said last named means including a bi-directional stepping switch for controlling said resistance, means for determining whether the cars are early or late in arriving at said terminal floor with respect to the initiations of the dispatching operations for that terminal floor, means responsive to said determining means upon a late arrival of a car at said terminal floor for causing operation of said stepping switch to adjust said resistance to increase the interval, and means responsive to said determining means upon an early arrival of a car at said terminal floor for causing operation of said stepping switch to adjust said resistance to decrease the interval.

30. In a displatching and control system for a plurality of elevator cars, means including a time switch and a resistance for controlling the operation of said switch for providing time intervals for dispatching, means for initiating the dispatching of the cars from a given terminal floor at the expiration of successive said time intervals subject to said time interval means, and means for controlling said time interval means to adjust the duration of the timing intervals, said last named means including a bi-directional stepping switch for controlling said resistance, a switch responsive to the arrival of a car at said terminal floor after the initiation of the dispatching operation for causing operation of said stepping switch in a direction to adjust said resistance to control the timing of said timing switch to increase the interval, a second timing switch, and means responsive to the arrival of a car at said terminal floor for initiating operation of said second timing switch, said second timing switch operating in the event that said dispatching operation is not initiated within a certain time interval after initiation of the operation of said second timing switch to cause operation of said stepping switch in the opposite direction to adjust said resistance to control the timing of said first timing switch to decrease said interval.

31. In a dispatching and control system for a plurality of elevator cars having a plurality of operating programs, means for initiating the dispatching of the cars from the terminal floors, means for indicating the ratio of up traffic to down traffic, means for controlling the relative amount of time allotted to the trips in each direction, and means responsive to said indicating means upon an indication of a certain increased ratio of up traffic to down traffic for causing operation of said time allotting means to increase the time allotted to the up trips with respect to that allotted to the down trips and upon an indication of a certain increased ratio of down traffic to up traffic for causing operation of said time allotting means to increase the time allotted to the down trips with respect to that allotted to the up trips.

32. In a dispatching and control system for a plurality of elevator cars having a plurality of operating programs, means for initiating the dispatching of the cars from the bottom terminal floor, a bi-directional stepping switch, means for indicating the ratio of up traffic to down traffic, means operable incident to each dispatching operation in response to said indicating means upon an indication of an increased ratio of up traffic to down traffic for causing operation of said stepping switch one step in a given direction and upon an indication of an increased ratio of down traffic to up traffic for causing operation of said stepping switch one step in the opposite direction, and means responsive to of said stepping switch upon a given number of operations thereof from a neutral position in either direction for changing over from the program under which the system is operating to a program suited to the traffic conditions indicated by the operation of the stepping switch.

33. In a dispatching and control system for a plurality of elevator cars having a plurality of operating programs, means for providing time intervals for dispatching, means for initiating the dispatching of the cars from a given terminal floor at the expiration of successive predetermined time intervals subject to said time interval means, a bi-directional stepping switch, means for determining whether the cars are early or late in arriving at said terminal floor with respect to the initiations of the dispatching operations for that terminal floor, means responsive to said determining means upon each late arrival of a car at said terminal floor for causing operation of said stepping switch one step in a given direction, means responsive to said determining means upon each early arrival of a car at said terminal floor for causing operation of said stepping switch one step in the opposite direction, and means responsive to said stepping switch upon a given number of operations thereof from a neutral position in either direction for changing over from the program under which the system is operating to a program suited to the traffic conditions indicated by the operation of the stepping switch.

34. In a dispatching and control system for a plurality of elevator cars having a plurality of operating programs, means for providing time intervals for dispatching, means for initiating the dispatching of the cars from a given terminal floor at the expiration of successive predetermined time intervals subject to said time interval means, a bi-directional stepping switch, means for determining whether the cars are early or late in arriving at said terminal floor with respect to the initiations of the dispatching operations for that terminal floor, means responsive to said determining means upon each late arrival of a car at said terminal floor for causing operation of said stepping switch one step in a given direction, means responsive to said determining means upon a car being more than half an interval late for causing an additional operation of said stepping switch in said given direction, means responsive to said determining means upon each early arrival of a car at said given terminal floor for causing operation of said stepping switch one step in the opposite direction, and means responsive to said stepping switch upon a given number of operations thereof from a neutral position in either direction for changing over from the program under which the system is operating to a program suited to the traffic conditions indicated by the operation of the stepping switch.

35. In a dispatching and control system for a plurality of elevator cars having a plurality of operating programs, a stepping switch, means responsive to a given number of steps of operation of said stepping switch in a given direction from a certain position for changing over from the program under which the system is operating to a program suited for greater service in the up direction, load measuring means for each car, means responsive to said load measuring means upon a car at the bottom terminal floor taking on a certain load for causing operation of said stepping switch one step in said given direction.

36. In a dispatching and control system for a plurality of elevator cars having a plurality of operating programs, a stepping switch, means responsive to a given number of steps of operation of said stepping switch in a given direction from a certain position for changing over from the program under which the system is operating to a program suited for greater service in the down direction, load measuring means for each car, means responsive to said load measuring means upon the arrival of a car at the bottom terminal floor with a certain load for causing operation of said stepping switch one step in said given direction.

37. In a dispatching and control system for a plurality of elevator cars having a plurality of operating programs, means for providing time intervals for dispatching, means for initiating the dispatching of the cars from the bottom terminal at the expiration of successive predetermined time intervals subject to said time interval means, means for selecting the cars for dispatching at said terminal, a first switch controlled by said selecting means and timed to operate upon the expiration of a predetermined time interval after operation of said selecting means, a second switch controlled by said selecting means and timed to operate upon the expiration of a longer predetermined time interval after operation of said selecting means, a bi-directional stepping switch, a late car switch responsive to said dispatch initiating means upon the initiation of the dispatching operation before said operation of said first switch for causing operation of said stepping switch one step in a given direction, an early car switch responsive to said second switch upon operation thereof before the initiation of the dispatching operation for causing operation of said stepping switch one step in the opposite direction, and means responsive to said stepping switch upon a given number of operations thereof from a neutral position in either direction for changing over from the program under which the system is operating to a program suited to the traffic conditions indicated by the operation of the stepping switch.

38. In a dispatching and control system for a plurality of elevator cars, means for providing time intervals for dispatching, means for initiating the dispatching of the cars at the expiration of successive predetermined time intervals subject to said time interval means, means for selecting the cars for dispatching at the bottom terminal, a pair of timed switches having different time delay periods, means operable incident to operation of said selecting means to select a car for dispatching for initiating the timing of said switches, and means controlled by the relationship of the initiation of the dispatching operation by said dispatch initiating means to the timing out of said switches for indicating a late car when the dispatching operation is initiated before the timing out of the switch with the shorter interval and an early car when the dispatching operation is initiated after the timing out of the switch with the longer interval.

39. In a dispatching and control system for a plurality of elevator cars having a plurality of operating programs, means for providing time intervals for dispatching, means for initiating the dispatching of the cars at the expiration of said time intervals, means for selecting the cars for dispatching at the bottom terminal, a pair of timed switches having different time delay periods, means operable incident to operation of said selecting means to select a car for dispatching for initiating the timing of said switches, means controlled by the relationship of the initiation of the dispatching operation by said dispatch initiating means to the timing out of said switches for indicating a late car when the dispatching operation is initiated before the timing out of the switch with the shorter interval and an early car when the dispatching operation is initiated after the timing out of the switch with the longer interval, and means responsive to said early and late car indicating means upon a certain predominance of early cars for changing over to a program to provide more service in the up direction and upon a certain predominance of late cars for changing over to a program to provide more service in the down direction.

40. In a dispatching and control system for a plurality of elevator cars, means for providing time intervals for dispatching, means for initiating the dispatching of the cars at the expiration of said time intervals, means for selecting the cars for dispatching at the bottom terminal, a first switch having an operating coil and a circuit therefor and being timed to drop out upon the expiration of a predetermined time interval after the breaking of the circuit for its operating coil, a second switch having an operating coil and a circuit therefor and being timed to drop out upon the expiration of a longer predetermined time interval after the breaking of the circuit for its operating coil, means responsive to the operation of said selecting means for breaking the circuits for said switch operating coils, and means controlled by the relationship of the initiation of the dispatching operation by said dispatch initiating means to the dropping out of said switches for indicating a late car when the dispatching operation is initiated before the dropping out of said first switch, an early car when the dispatching operation is initiated after the dropping out of said second switch, and an on time car when the dispatching operation is initiated after the dropping out of said first switch but before the dropping out of said second switch.

41. In a dispatching and control system for a plurality of elevator cars having a plurality of operating programs, means for initiating the dispatching operations, means for determining whether the cars are early, late or on time with respect to the initiations of the dispatching operations in arriving at the bottom terminal, means for registering the amount of service demand, and means responsive upon operation of said service demand means to indicate certain service demand conditions to said early, late or on time car determining means under conditions where early cars predominate upon a certain preponderance of early cars over late and on time cars for changing over to a program to provide more service in the up direction and under conditions where late cars predominate upon a certain preponderance of late cars over early and on time cars for changing over to a program to provide more service in the down direction.

42. In a dispatching and control system for a plurality of elevator cars having a plurality of operating programs, means for initiating the dispatching operations, means for determining whether the cars are early, late or on time with respect to the initiations of the dispatching operations in arriving at the bottom terminal, means for registering the amount of service demand, and means responsive upon operation of said service demand means to indicate certain service demand conditions to said early, late or on time car determining means under conditions where early cars predominate upon a certain preponderance of early cars over late and on time cars for changing over to a program to provide more service in the up direction and under conditions where late cars predominate upon a certain preponderance of late cars over early cars for changing over to a program to provide more service in the down direction.

43. In a dispatching and control system for a plurality of elevator cars having a plurality of operating programs, means for initiating the dispatching operations, means for determining whether the cars are early, late or on time with respect to the initiations of the dispatching operations in arriving at the bottom terminal, means for registering the amount of service demand, and means responsive upon operation of said service demand means to indicate certain service demand conditions to said early, late or on time car determining means under conditions where early cars predominate upon a certain preponderance of early cars over late cars for changing over to a program to provide more service in the up direction and under conditions where late cars predominate upon a certain preponderance of late cars over early and on time cars for changing over to a program to provide more service in the down direction.

44. In a dispatching and control system for a plurality of elevator cars having a plurality of operating programs, means for initiating the dispatching operations, means for determining whether the cars are early, late or on time with respect to the initiations of the dispatching operations in arriving at the bottom terminal, means for registering the amount of service demand, and means responsive to said early, late or on time car determining means under conditions where early cars predominate upon a certain preponderance of early cars over late and on time cars upon operation of said service demand means to indicate medium service demand conditions and over late cars upon operation of said service demand means to indicate light service demand conditions for changing over to a program to provide more service in the up direction and under conditions where late cars predominate upon a certain preponderance of late cars over early and on time cars upon operation of said service demand means to indicate medium and light service demand conditions for changing over to a program to provide more service in the down direction.

45. In a dispatching and control system for a plurality of elevator cars having a plurality of operating programs, means for initiating the dispatching operations, means for determining whether the cars are early, late or on time with respect to the initiations of the dispatching operations in arriving at the bottom terminal, means for registering the amount of service demand, and means responsive to said early, late or on time car determining means under conditions where early cars predominate upon a certain preponderance of early cars over late and on time cars upon operation of said service demand means to indicate medium and heavier service demand conditions for changing over to a program to provide more service in the up direction and under conditions where late cars predominate upon a certain preponderance of late cars over early and on time cars upon operation of said service demand means to indicate medium service demand conditions and over early cars upon operation of said service demand means to indicate heavier service demand conditions for changing over to a program to provide more service in the down direction.

46. In a dispatching and control system for a plurality of elevator cars having a plurality of operating means for providing time intervals for dispatching, means for initiating the dispatching of the cars at the expiration of said time intervals, means for selecting the cars for dispatching at the bottom terminal, a pair of timed switches having different time delay periods, means operable incident to the selection of a car for dispatching for initiating the timing of said switches, means controlled by the relationship of the initiation of the dispatching operation by said dispatch initiating means to said service demand registering means upon the timing out of said switches for indicating a late car when the dispatching operation is initiated before the timing out of the switch with the shorter interval, an early car when the dispatching operation is initiated after the timing out of the switch with the longer interval and an on time car when the dispatching operation is initiated after the timing out of the switch with the shorter interval but before the timing out of the switch with the longer interval, means for registering the amount of service demand, means responsive said service demand means upon a certain service demand for causing on time cars to be considered as early cars under conditions where late cars predominate and as late cars under conditions where early cars predominate, and means controlled by said early and late car indicating means and said service demand responsive means under certain preponderance of early or late cars for selecting the operating programs.

47. In a dispatching and control system for a plurality of elevator cars having a plurality of operating programs, means for initiating the dispatching of the cars, means for determining whether the cars are early, late or on time with respect to the initiations of the dispatching operations in arriving at the bottom terminal, means for registering the amount of service demand, a bi-directional stepping switch having a neutral position, means responsive to said determining means upon each late car for causing operation of said stepping switch one step in a given direction and upon each early car for causing operation of said stepping switch one step in the opposite direction, means responsive to said service demand registering means for causing an on time car to act as a late car under certain service demand conditions to cause under conditions where said stepping switch is in said opposite direction from neutral position operation of said stepping switch one step in said given direction, and as an early car under certain service demand conditions to cause under conditions where said stepping switch is in said given direction from neutral position operation of said stepping switch one step in said opposite direction, and means responsive to operation of said stepping switch to a position a given number of steps from neutral position in either direction for changing over from the program under which the system is operating to a program suited to the traffic conditions indicated by the operation of the stepping switch.

48. In a dispatching and control system for a plurality of elevator cars having an intermittent program and an up peak program, clock actuated means operable at a certain time of day to switch over from said intermittent program to said up peak program, means for registering demand for service, and means controlled by said service demand means for preventing switching over from said intermittent program to said up peak program in response to said clock actuated means under conditions where there is no demand for service.

49. In a dispatching and control system for a plurality of elevator cars having an intermittent program and an up peak program, clock actuated means operable at a certain time of day to switch over from said intermittent program to said up peak program, means for each car operable when that car is started in operation, and means controlled by said car in operation means for preventing switching over from said intermittent program to said up peak program in response to said clock actuated means under conditions where no car has been started in operation.

References Cited in the file of this patent

UNITED STATES PATENTS

| | | |
|---|---|---|
| 2,589,292 | Santini | Mar. 18, 1952 |
| 2,597,586 | Keiper et al. | May 20, 1952 |
| 2,642,158 | Eames | June 16, 1953 |

UNITED STATES PATENT OFFICE

CERTIFICATE OF CORRECTION

Patent No. 2,761,528                                              September 4, 1956

William Frank Glaser et al.

It is hereby certified that error appears in the printed specification of the above numbered patent requiring correction and that the said Letters Patent should read as corrected below.

Column 2, line 22, after "traffic" insert -- to up traffic --; column 12, line 62, for "Swith WM is" read -- Switch WM is --; column 15, line 30, for "shifting" read -- shutting --; column 30, line 68, after "responsive" insert -- to --.

Signed and sealed this 7th day of January 1958.

(SEAL)
Attest:
KARL H. AXLINE
Attesting Officer

ROBERT C. WATSON
                                                                                      Commissioner of Patents